United States Patent [19]
Hashomoto et al.

[11] Patent Number: 5,668,652
[45] Date of Patent: Sep. 16, 1997

[54] OPTICAL WDM (WAVELENGTH DIVISION MULTIPLEXING) TRANSMISSION SYSTEM AND METHOD FOR CONFIGURING THE SAME

[75] Inventors: Masashi Hashomoto; Norio Tamaki, both of Yokosuka; Kiyomi Kumozaki; Ryu-ichi Watanabe, both of Zushi, all of Japan

[73] Assignee: Nippon Telegraph & Telephone Corporation, Tokyo, Japan

[21] Appl. No.: 602,493

[22] Filed: Feb. 20, 1996

[30] Foreign Application Priority Data

Feb. 24, 1995 [JP] Japan .................................. 7-037198
Mar. 6, 1995 [JP] Japan .................................. 7-045834

[51] Int. Cl.$^6$ ........................................... H04J 14/02
[52] U.S. Cl. ......................... 359/125; 359/133; 385/24
[58] Field of Search ........................... 359/124, 123, 359/125, 133, 127, 114; 385/24, 31

[56] References Cited

U.S. PATENT DOCUMENTS 5,212,578  5/1993  Grimes et al. .......................... 359/124
5,357,360  10/1994  Imhoff et al. .......................... 359/125

FOREIGN PATENT DOCUMENTS 62-290219 A  12/1987  Japan .

OTHER PUBLICATIONS

"Fiber to the Home", OPTRONICS No. 123, 1992, pp. 59–64. (separate page included for English translation of par. 4.1).

"Fiber-Optic Subscriber Systems for Narrowband Services", Kenji Okada and Ryuichi Watanabe, NTT R&D, No. 7, vol. 42, 1993, pp. 857–868 (Abstract in English on p. 857).

*Primary Examiner*—Kinfe-Michael Negash
*Attorney, Agent, or Firm*—Frishauf, Holtz, Goodman, Langer & Chick, P.C.

[57] ABSTRACT

An optical WDM transmission system formed by integrating by using an optical WDM device at least two point-to-multipoint optical transmission systems which provide independent services by using optical signals of different wavelengths. It provides a plurality of user terminals with optical signals obtained by splitting with an optical splitter an optical signal which is wavelength multiplexed by the WDM device. The splitting numbers of optical splitters placed ahead of or behind the WDM device are set such that a loss from the center terminal to the user terminals of each optical transmission system falls within an allowed loss of each system. Since the splitting numbers of the optical system of each system can be set independently, each system can accommodate a maximum number of user terminals per center terminal within the allowed loss of the system.

12 Claims, 29 Drawing Sheets

SYSTEM 1 ($\lambda_1$) + SYSTEM 2 ($\lambda_2$)

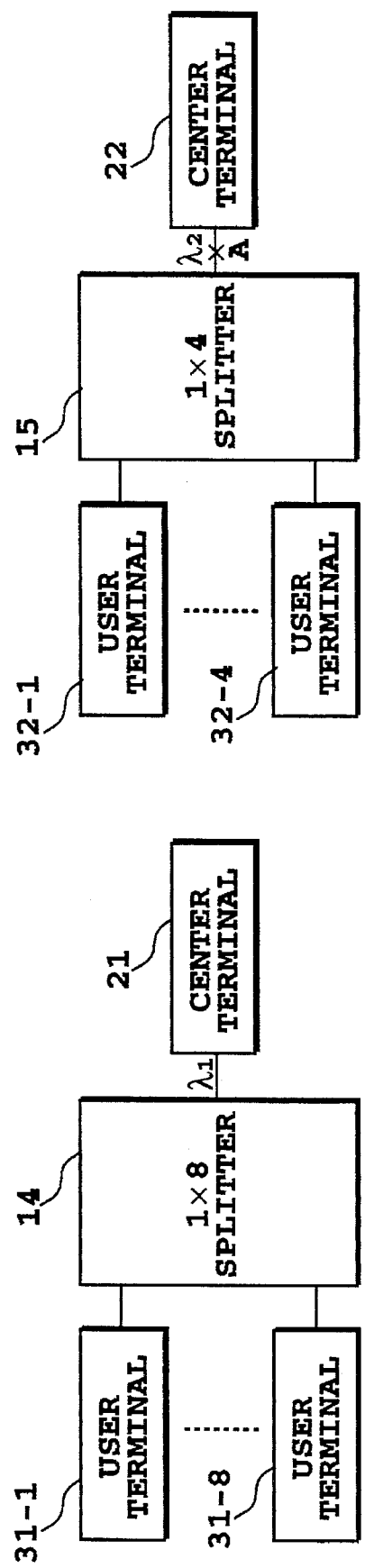

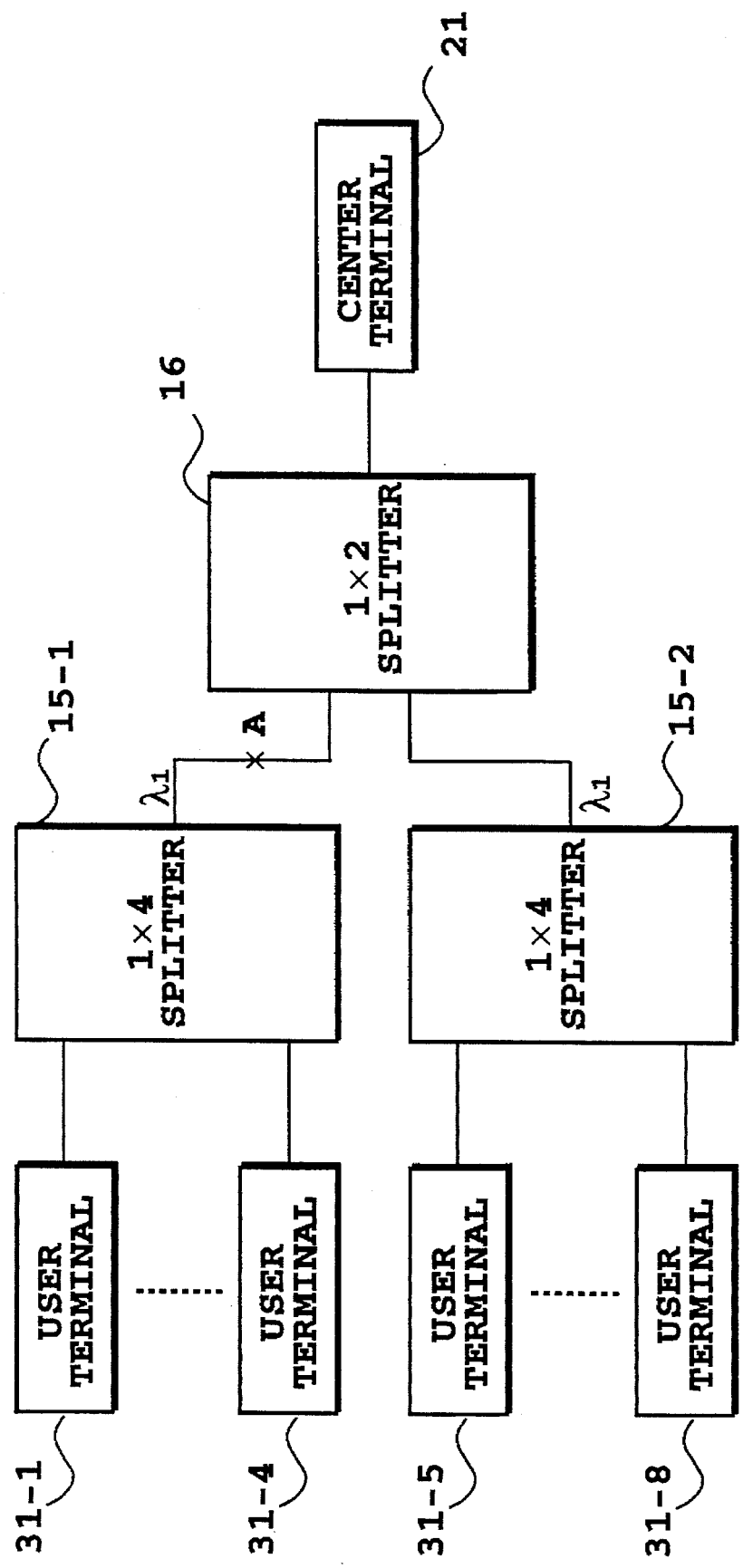
FIG. 6C SYSTEM 1

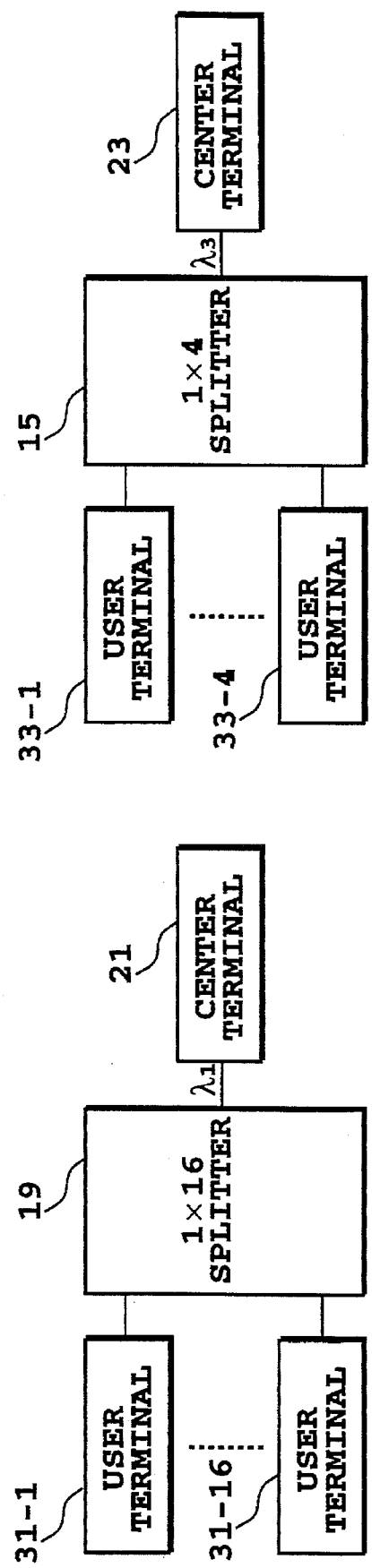
FIG. 8C  SYSTEM 3 (WAVELENGTH λ3)
FIG. 8A  SYSTEM 1 (WAVELENGTH λ1)

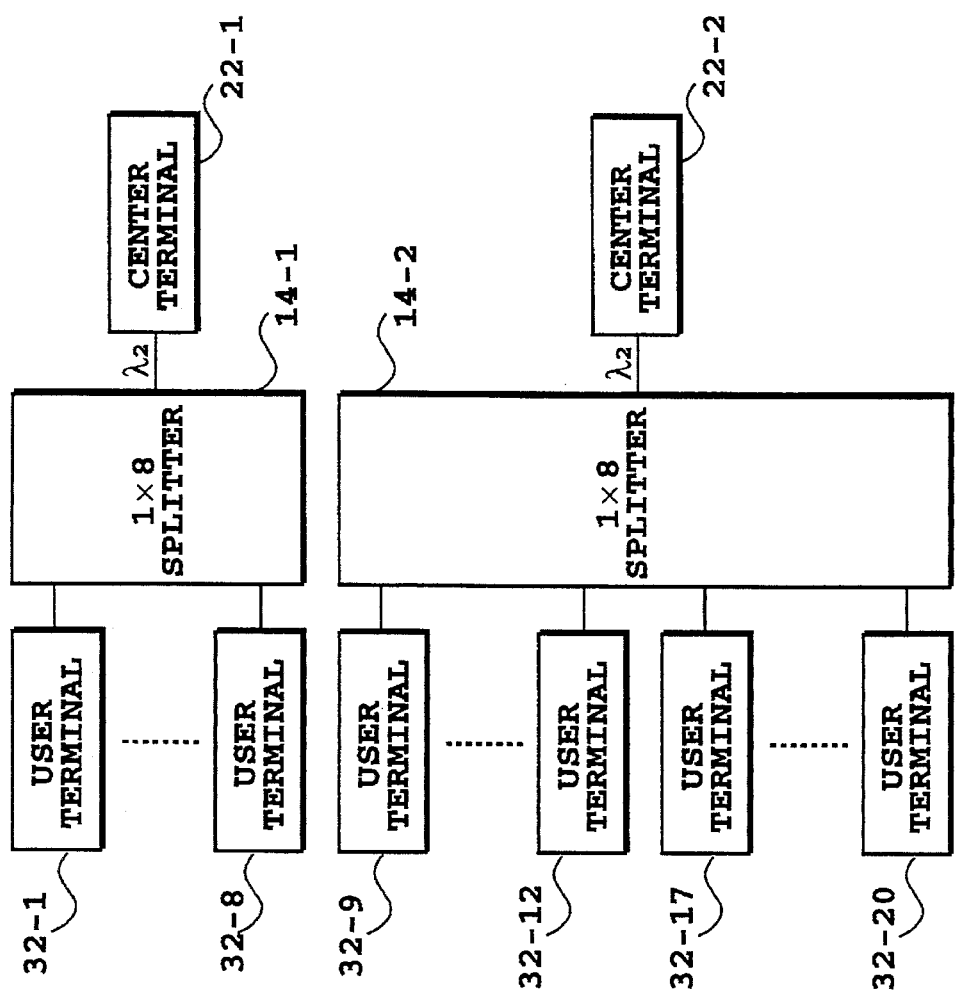
FIG. 8B  SYSTEM 2 (WAVELENGTH $\lambda_2$)

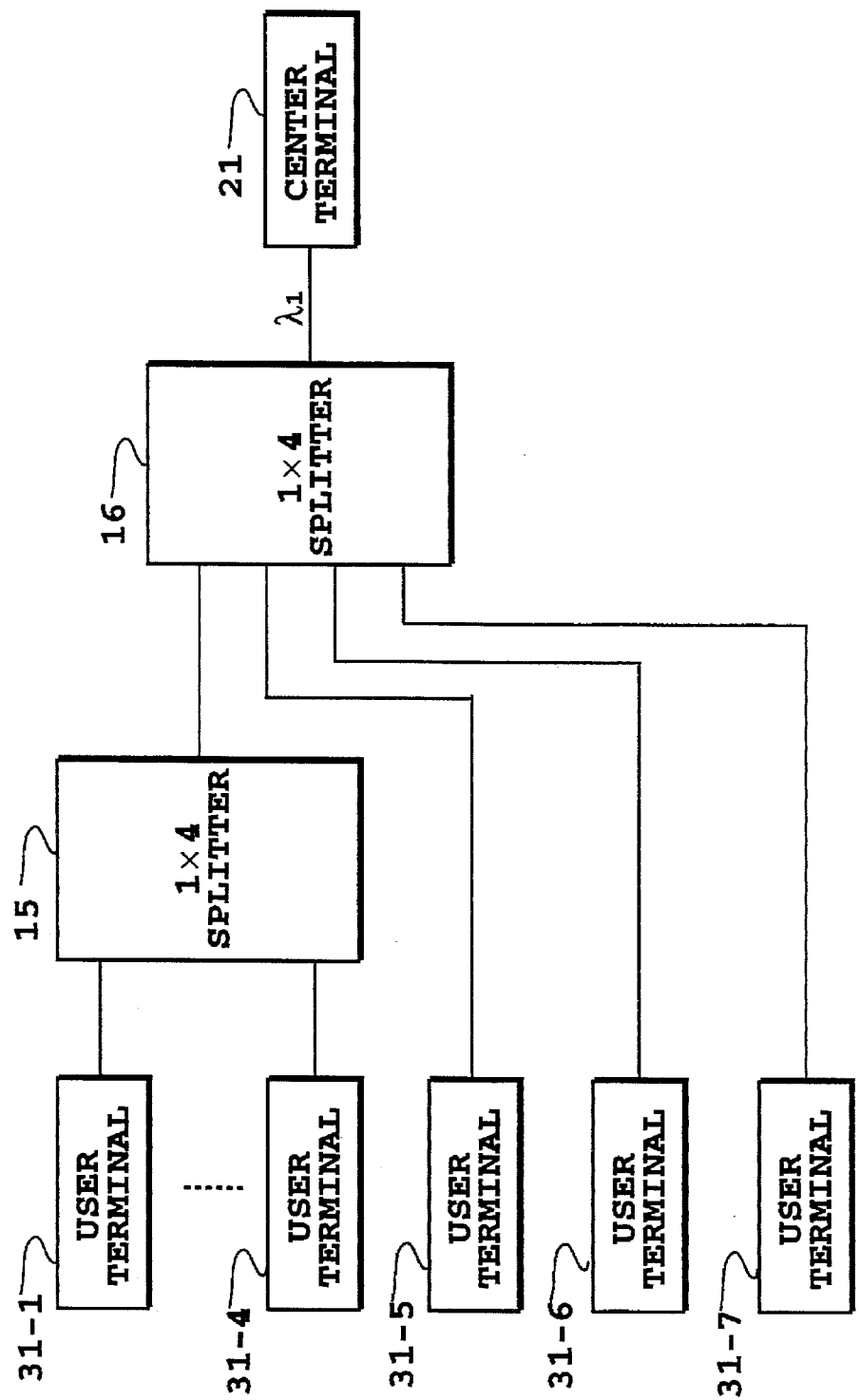

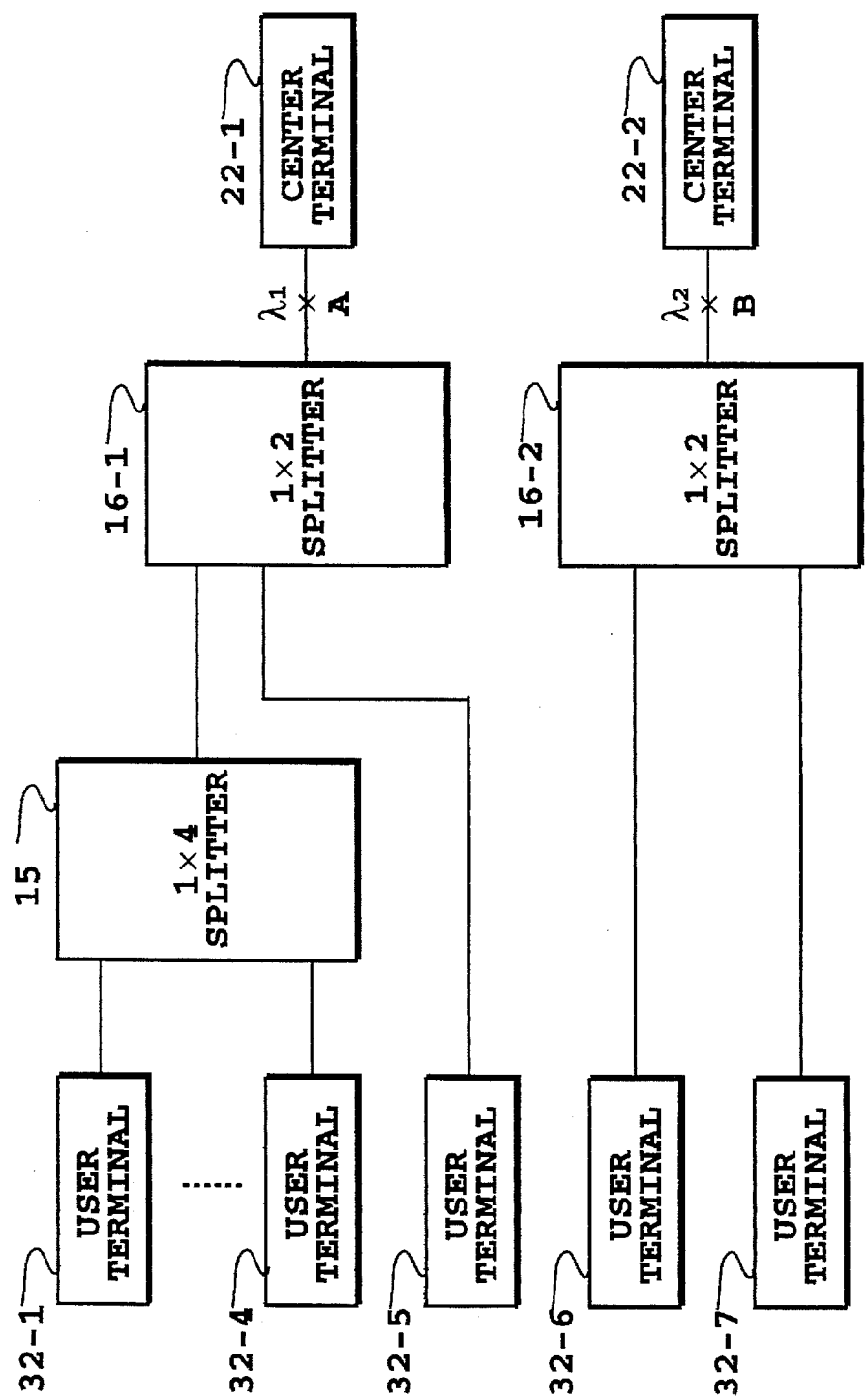
FIG. 13B  SYSTEM 2 (WAVELENGTH $\lambda_2$)

SYSTEM 1

SYSTEM 2

10

OPTICAL WDM (WAVELENGTH DIVISION MULTIPLEXING) TRANSMISSION SYSTEM AND METHOD FOR CONFIGURING THE SAME

BACKGROUND OF THE INVENTION

1. Field of the Invention

The present invention relates to an optical WDM (Wavelength Division Multiplexing) transmission system which performs communications between center terminals (transmission equipment at central office) and user terminals (transmission equipment at subscriber premises) by using optical WDM, and particularly to an optical WDM transmission system and a method for configuring the same capable of accommodating, in a system having different allowed losses between center terminals and user terminals, the greatest number of user terminals within the allowed losses.

2. Description of Related Art

Recently, intensive researches have been carried out into PDS (Passive Double Star) optical subscriber network systems to implement FTTH (Fiber To The Home) in many nations.

FIG. 1 shows a conventional PDS optical subscriber network system, a partially modified one of the system disclosed in Japanese patent application laying-open No. 62-290219. The PDS system is provided with optical star couplers 7, which are passive components, at splitting points on transmission lines, and performs time division multiplexing bidirectional communications between center terminals 5 installed in a central office and a plurality of user terminals 6. This system makes it possible to reduce its cost by sharing the center terminals 5 and transmission lines among a plurality of user terminals 6.

The number of the user terminals 6 that can be connected to an optical star coupler is not fixed. For example, the user terminals in a subscriber area ($A_4$, for example) at a short distance from the center terminal 5 are connected to the center terminal 5 through an optical star coupler 7 with a large splitting number. As the distance from the center terminal 5 increases, optical star couplers with smaller splitting numbers are used. For example, the user terminals in the farthest area $A_2$ are connected to the center terminal 5 through a star coupler 7 whose splitting number is two. This is because losses from the center terminal 5 to the user terminals 6 increase with the transmission distance, and hence the splitting numbers must be reduced with the distance.

Let us suppose a PDS system that provides different types of services. Such a system handles various types of signals from low-rate narrowband signals like telephone signals to high-rate wideband signals represented by video signals. Thus, it handles diverse rate, capacity and data modulation.

It would be possible to integrally provide various services for the entire users by using a wideband signal. Such a system configuration, however, must employ high-rate transmission devices even for users who needs only low-rate services such as telephone, and this will increase the system cost.

There is still another problem. When receiving video signals, for example, an economical system can be implemented by utilizing commercially available TV sets. This will require analog modulation such as AM modulation, or FM modulation. The wideband analog signals, however, will not be directly transmitted through optical transmission paths because they cannot be electrically multiplexed with digital signals without conversion. To implement such a system by using high-rate digital transmission lines, converters for converting digital signals into analog signals and vice versa are needed, and this will increase its cost.

In view of this, a system using WDM transmission is proposed. For example, a system providing a low-rate bidirectional communication service like telephone simultaneously with a wideband unidirectional transmission service like CATV can be implemented by wavelength division multiplexing low-rate bidirectional transmission at 1.3 μm band, and wideband unidirectional transmission at 1.55 μm band. In such a PDS system using the WDM, a plurality systems offering different services can share the transmission lines.

The PDS system has an advantage of being economical because one center terminal is shared with multiple user terminals. For example, the center terminal connected with the user terminals in the area $A_4$ of FIG. 1 has the highest economical effect due to user multiplexing in the center terminals in FIG. 1. Thus, an increasing splitting number gives a more economical system. On the other hand, optical loss is directly proportional to an increase in the splitting number. Since the allowed optical losses of the systems offering various services are limited, the splitting numbers must be set within the allowed losses. The allowed losses depend not only on the transmission distance, but also on the types of services, and the transmission rate and modulation method of the services. For example, to implement a wideband communication service such as video signal distribution in addition to an existing low-rate communication service like a public telephone service by using WDM, the allowed losses from the center terminals offering these services to a particular user terminal will differ from each other. This will cause the following problem in a system that offers different services by using WDM.

FIG. 2 shows a system configured by combining through a WDM device two point-to-multipoint optical transmission systems which offer services independent of each other.

In this figure, n user terminals 30-1–30-n are each connected to two center terminals 21 and 22 through optical fiber transmission paths 13, an n-optical splitter 12 and an optical WDM device 17. The forward link optical signals with wavelengths of $\lambda_1$ and $\lambda_2$ output from the center terminals 21 and 22, respectively, undergo the TDM (Time Division Multiplexing) by the center terminals and the WDM by the optical WDM devices 17, split by the n-optical splitter 12, and transmitted to the user terminals 30-1–30-n. Each user terminal acquires the optical signals sent thereto from the WDM forward optical signals.

On the other hand, some user terminals which carry out bidirectional communications in the user terminals 30-1–30-n transmit optical signals at timings assigned by the TDM. These optical signals transmitted from the user terminals are generated by modulating light fed from a light source in the user terminals or light fed from the center terminals. These reverse link signals from the user terminals are passively multiplexed on the time axis by the n-optical splitter 12, split into the optical signals with wavelengths of $\lambda_1$ and $\lambda_2$ by the optical WDM device 17, and received by the center terminals 21 and 22.

With such an arrangement, the user terminals 30-1–30-n can each communicate with the center terminals 21 and 22 by selecting one of the wavelengths. Thus, when the center terminals offer different services, each user terminal can receive different services through the same transmission paths.

The point-to-multipoint optical transmission systems which offer independent services are optimally designed individually regarding factors such as modulation methods, devices used, transmitted signal bandwidth, reliability, and cost. As a result, the allowed losses for the optical fibers and splitters take values proper to respective systems, and the numbers of user terminals accommodated by individual systems, which depend on the splitting numbers, differ from each other. For this reason, in the conventional method which integrates two or more systems offering different types of services into one system by WDM, the allowed loss of the new system is set at the minimum allowed loss among the systems to be integrated.

This will be described by an example in which a system 1 and a system 2 shown in FIGS. 4A and 4B are integrated. The system 1 accommodates eight user terminals 31-1–31-8 through an 8-optical splitter 14, and the system 2 accommodates four user terminals 32-1–32-4 through 4-optical splitter 15. These systems cannot be integrated into one system having a configuration as shown in FIG. 2.

In this case, it is necessary to separate the system 1 as shown in FIG. 4C, and then integrate the two systems 1 and 2 as shown in FIG. 3. More specifically, the two systems must be integrated in the steps of first separating the system 1 in accordance with the system 2 with a lower allowed loss (splitting number), and then combining the two systems 1 and 2 using a WDM device 17. Here, user terminals 35-1–35-4 are arranged as shown in FIG. 9A. Thus, when a plurality of PDS systems are integrated using one or more WDM devices to share transmission paths including star couplers, center terminals must be installed in accordance with the minimum splitting number among the possible splitting numbers of the respective systems. This hinders the conventional system from fully utilizing the splitting numbers of the individual systems.

This is a basic problem when utilizing the PDS transmission architecture and the WDM devices at the same time. Such a problem will not occur when the allowed losses are nearly equal in respective systems. The allowed losses, however, seldom agree with each other because the transmission methods and multiplexing numbers are independently determined to fully implement the individual services to be offered. In addition, designing the individual systems such that their allowed losses agree with each other will offset the advantage of the systems employing the WDM that a new system to be integrated with an existing system can be designed independently of the existing system.

SUMMARY OF THE INVENTION

It is therefore an object of the present invention to provide an optical WDM transmission system and a method for configuring the same which can fully utilize possible splitting numbers of respective systems when integrating a plurality of point-to-multipoint optical transmission systems having different allowed losses (possible splitting numbers) by means of WDM using one or more WDM devices.

In a first aspect of the present invention, there is provided an optical WDM (Wavelength Division Multiplexing) transmission system comprising:

a first center terminal for outputting a first optical signal with a wavelength of $\lambda_1$ and an output power of $P_1$;

a second center terminal for outputting a second optical signal with a wavelength of $\lambda_2$ and an output power of $P_2$;

first optical splitting means connected to an output port of the first center terminal for splitting the first optical signal at an attenuation factor of $A_1$;

optical multiplexing means connected to an output port of the second center terminal and an output port of the first optical splitting means for combining the second optical signal and the first optical signal;

second optical splitting means connected to an output of the optical multiplexing means for splitting a multiplexed optical signal of the first optical signal and the second optical signal at an attenuation factor of $A_2$;

a first user terminal connected to an output of the second optical splitting means for receiving the first optical signal, the first user terminal having a minimum receiving level of $R_1$; and a second user terminal connected to an output of the second optical splitting means for receiving the second optical signal, the second user terminal having a minimum receiving level of $R_2$;

wherein following expressions are satisfied:

$$R_1 \times A_1 \times A_2 \geq R_1, \text{ and}$$

$$P_2 \times A_2 \geq R_2.$$

Here, the WDM transmission system may further comprise third optical splitting means connected between the second center terminal and the optical multiplexing means for splitting the second optical signal at an attenuation factor of $A_3$, wherein following expressions are satisfied:

$$P_1 \times A_1 \times A_2 \geq R_1, \text{ and}$$

$$P_2 \times A_3 \times A_2 \geq R_2.$$

The first optical splitting means and the second optical splitting means may split an input optical signal to $2^N$ optical signals, respectively, where N is a positive integer.

A combination of the optical multiplexing means and the second optical splitting means may consist of:

multi-input port optical splitting means with its input ports being connected to the output port of the second center terminal and the output port of the first optical splitting means, respectively, and with its output ports being connected to the first user terminal and the second user terminal;

a first wavelength filter connected to the output port of the first center terminal for passing the first optical signal; and a second wavelength filter connected to the output of the second center terminal for passing the second optical signal.

At least part of the first optical splitting means and the optical multiplexing means may be mounted in the first center terminal.

The WDM transmission system may comprise:

a duplex transmission line provided from at least one of the first center terminal and the second center terminal to the second optical splitting means; and selecting means for connecting the output port of the center terminal associated with the duplex transmission line to one of the duplex line.

The WDM transmission system may comprise:

a duplex transmission line provided from at least one of the first user terminal and the second user terminal to the second optical splitting means; and selecting means for connecting an output port of the user terminal associated with the duplex transmission line to one of the duplex line.

The optical multiplexing means may be an optical WDM device for splitting an optical signal fed from the first user terminal and the second user terminal through the second optical splitting means into an optical signal with a wavelength of $\lambda_1$ and an optical signal with a wavelength of $\lambda_2$, and wherein at least one of a transmission line connecting the first center terminal and the first user terminal, and a transmission line connecting the second center terminal and the second user terminal is a bidirectional transmission line.

At least one of the first optical splitting means and the third optical splitting means may consist of a plurality of optical splitters connected in cascade.

In a second aspect of the present invention, there is provided a method for configuring an optical WDM (Wavelength Division Multiplexing) transmission system by integrating a first point-to-multipoint optical transmission system and a second point-to-multipoint optical transmission system into a point-to-multipoint optical transmission system, the first point-to-multipoint optical transmission system splitting a first optical signal with a wavelength of $\lambda_1$ output from a first center terminal, and supplying split optical signals to a plurality of first user terminals within a first allowed loss, and the second point-to-multipoint optical transmission system splitting a second optical signal with a wavelength of $\lambda_2$ output from a second center terminal, and supplying split optical signals to a plurality of second user terminals within a second allowed loss, the method comprising the steps of:

selecting a multi-service user terminal which receives both the first optical signal and the second optical signal from the first user terminals and the second user terminals;

establishing a transmission line for supplying the multi-service user terminal with an optical signal formed by splitting a third optical signal obtained by optically combining the first optical signal and the second optical signal; and setting a splitting number of at least one of the first optical signal and the second optical signal such that an optical loss from the first center terminal to the first user terminal falls within the first allowed loss, and an optical loss from the second center terminal to the second user terminal falls within the second allowed loss.

The method may further comprise the step of establishing a transmission line from the first user terminal to the first center terminal by time division multiplexing optical signals output from the first user terminals and supplying a time division multiplexed optical signal to the first center terminal.

According to the present invention, a plurality of point-to-multipoint optical transmission systems are integrated into a single optical transmission system using the WDM, thereby sharing the transmission lines including star couplers. In this new system, it is possible for the integrated individual optical transmission systems to make the best use of their possible splitting numbers without being limited by the other systems' allowed losses (possible splitting numbers) even if they differ from each other. In other words, each of the systems can accommodate the maximum number of user terminals corresponding to its possible splitting number. As a result, the number of user terminals accommodated in each center terminal can be increased as compared with the conventional system, thereby achieving a more economical system.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 6A–6C are block diagrams illustrating a method for configuring the first embodiment wherein FIGS. 6A and 6B show two systems to be integrated, and FIG. 6C shows a resolved system 1;

FIGS. 8A–8C are block diagrams showing three systems to be integrated in the second embodiment;

FIGS. 13A–13C are block diagrams illustrating a method for configuring the third embodiment wherein FIGS. 13A and 13B show two systems to be integrated, and FIG. 13C shows a resolved system 1;

FIGS. 16A–16D are graphs illustrating the effect of the present invention, wherein FIGS. 16A and 16B are graphs illustrating distribution of subscribers of systems 1 and 2, FIG. 16C is a graph showing the number of center terminals required when the systems 1 and 2 are integrated by the conventional method, and FIG. 16D is a graph showing the number of center terminals required when the systems 1 and 2 are integrated by the method in accordance with the present invention;

DETAILED DESCRIPTION OF PREFERRED EMBODIMENTS

The invention will now be described with reference to the accompanying drawings.

EMBODIMENT 1

Figure 1:
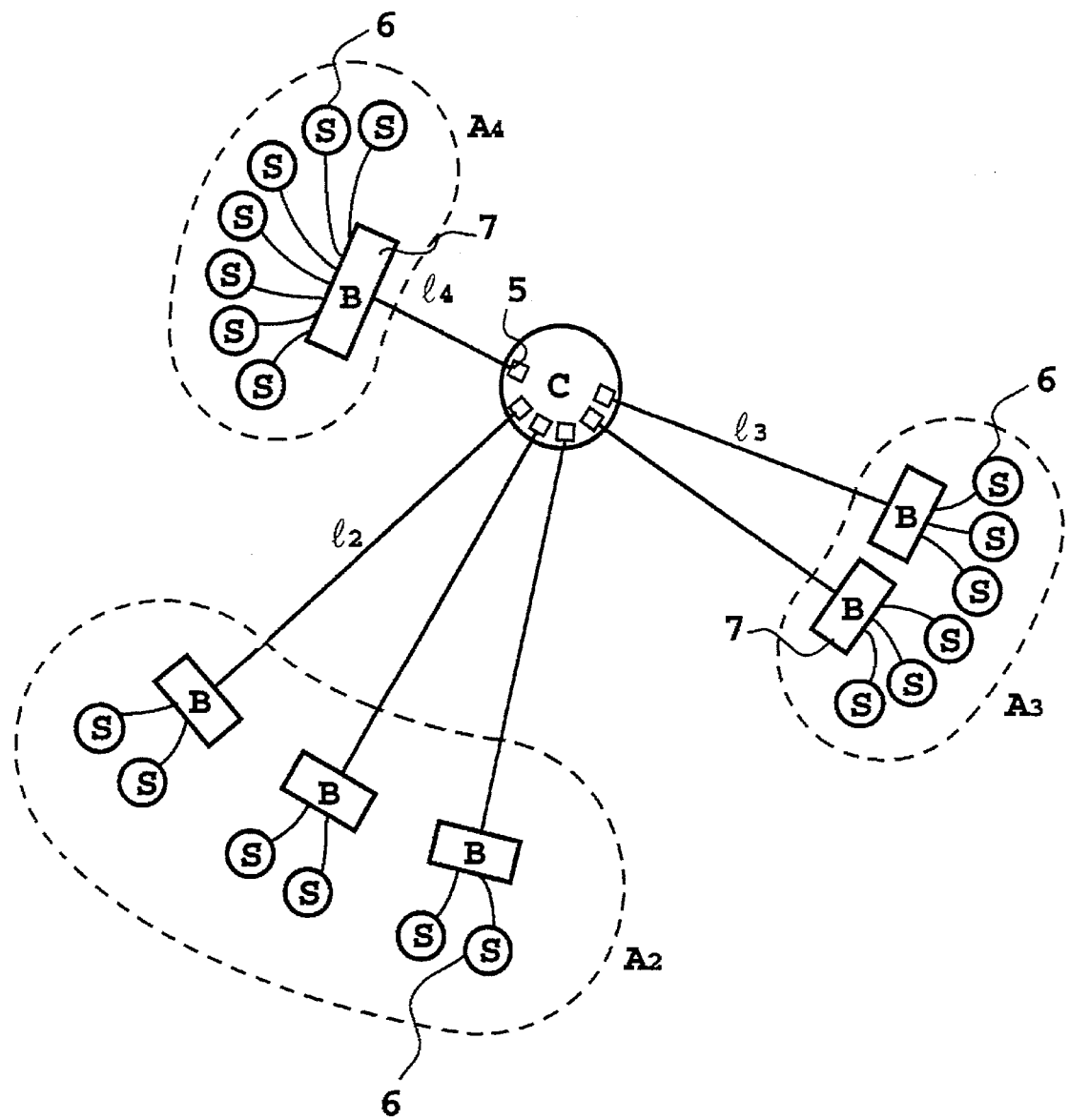
FIG. 1 is a block diagram showing an example of a conventional PDS optical transmission system.
Figure 2:
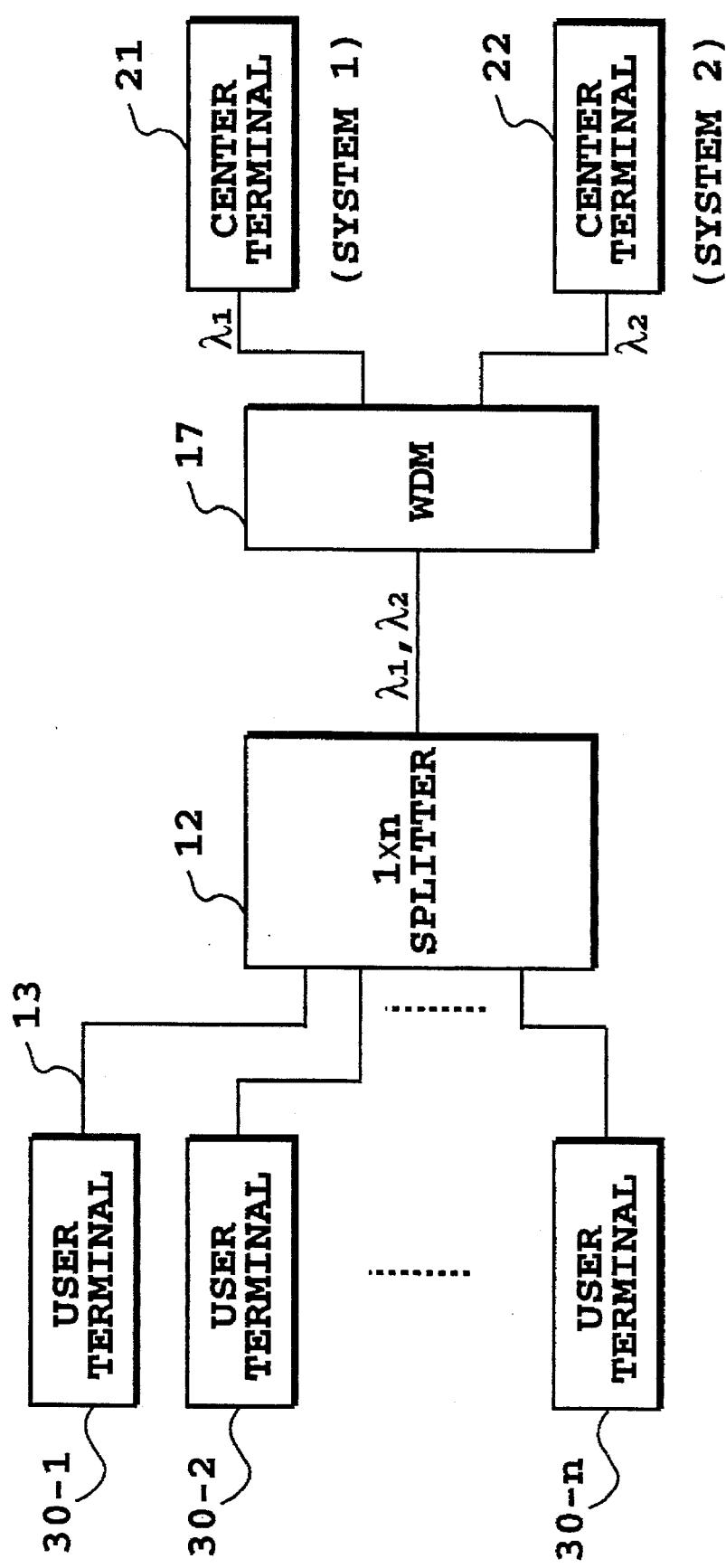
FIG. 2 is a block diagram showing an example of a conventional PDS optical transmission system using WDM.
Figure 3:
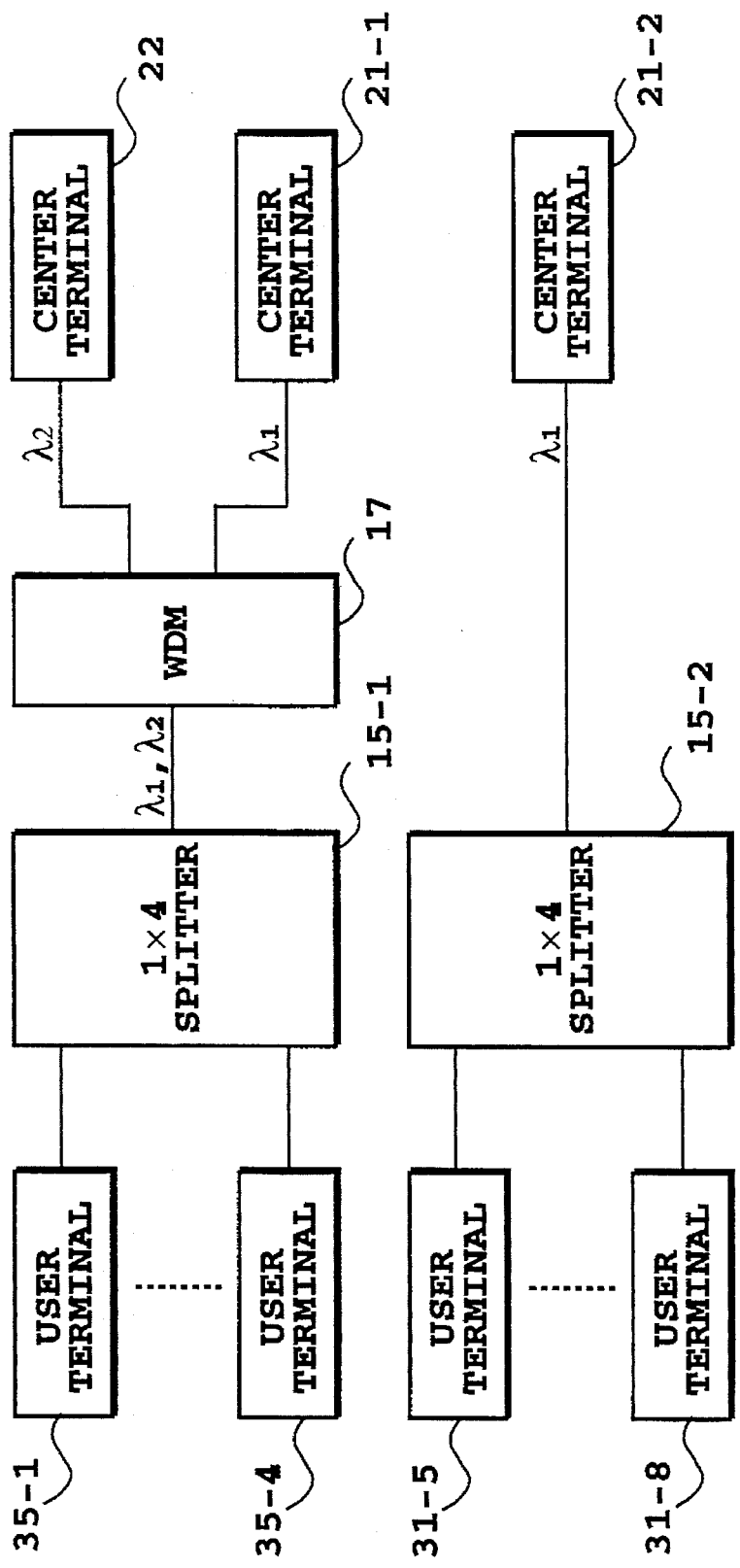
FIG. 3 and FIGS. 4A–4C are block diagrams showing a conventional method for configuring a PDS optical transmission system using WDM.
Figures 4A, 4B:
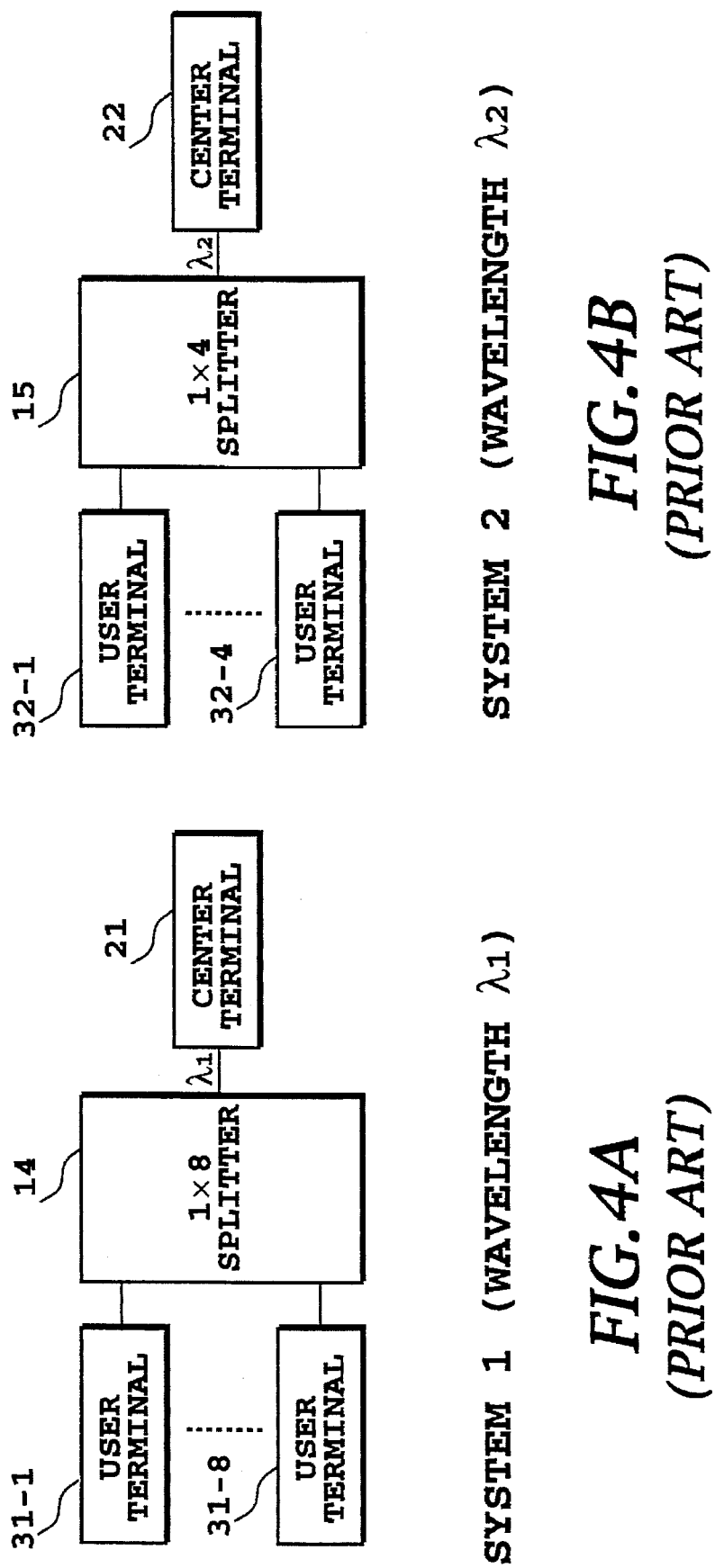
Figure 4C:
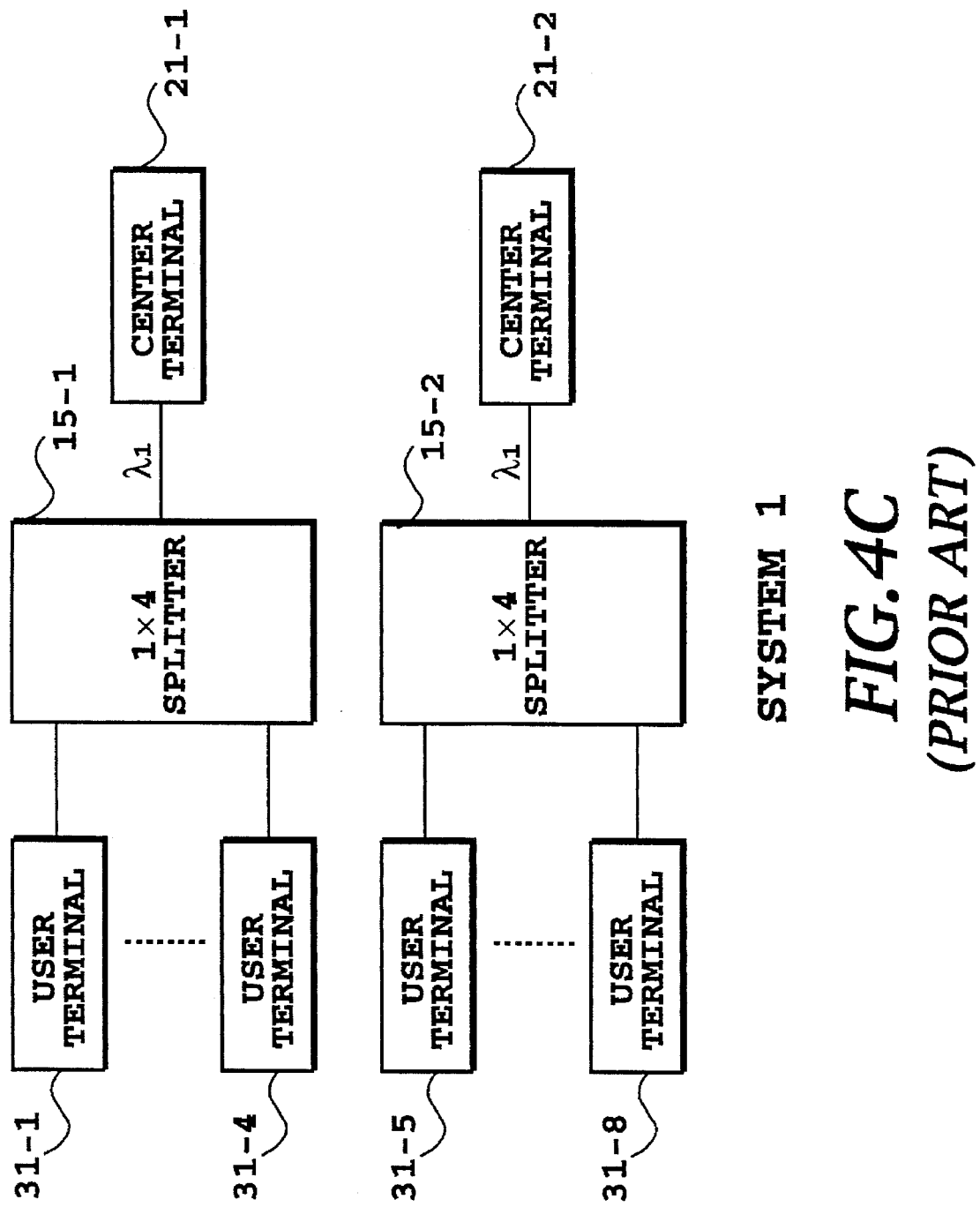
Figure 5:
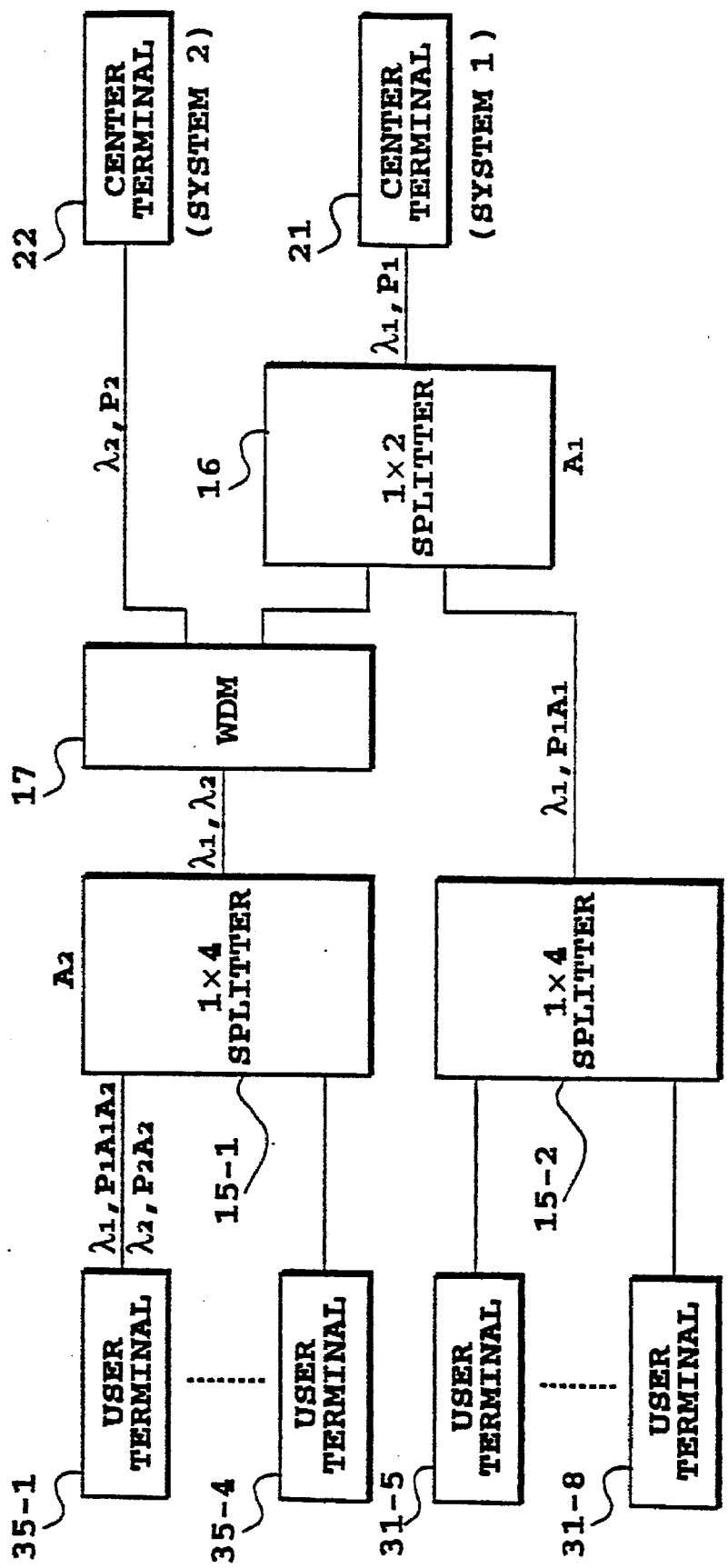
FIG. 5 is a block diagram showing a first embodiment of an optical WDM transmission system in accordance with the present invention.

FIG. 5 is a block diagram showing a first embodiment of an optical WDM transmission system in accordance with the present invention. In this embodiment, a system 1 using a first optical signal (wavelength $\lambda_1$) as shown in FIG. 6A, and a system 2 using a second optical signal (wavelength $\lambda_2$) as shown in FIG. 6B are integrated into a single system by means of WDM. The system 1 has a configuration in which eight user terminals 31-1–31-8 are connected to a center terminal 21 through 1×8 optical splitter 14. On the other hand, the system 2 has a configuration in which four user terminals 32-1–32-4 are connected to a center terminal 22 through 1×4 optical splitter 15.

Figure 9B:
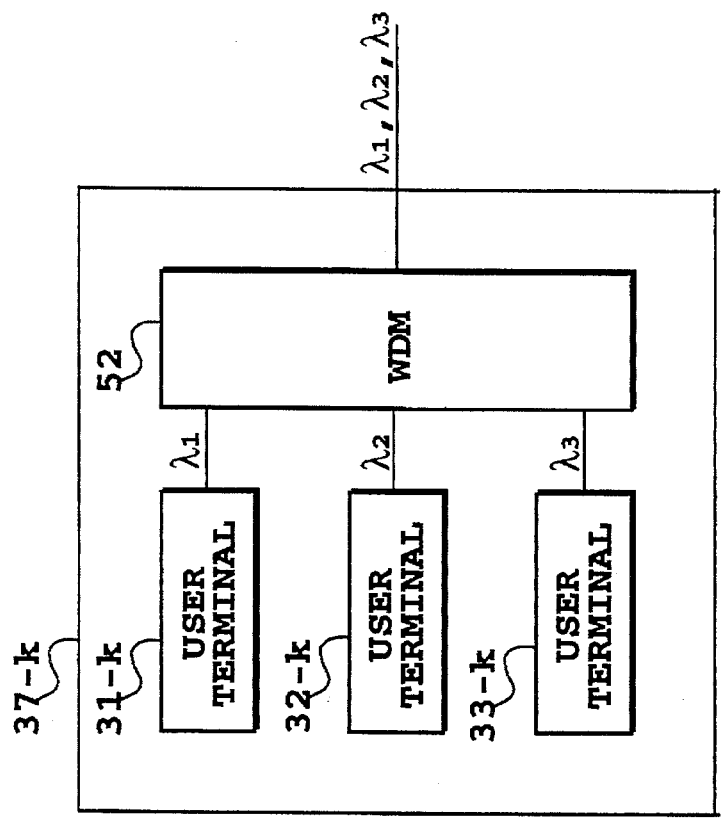
FIGS. 9A and 9B are block diagrams showing an arrangement of multi-service user terminals 35-k and 37-k, respectively.
Figure 9A:
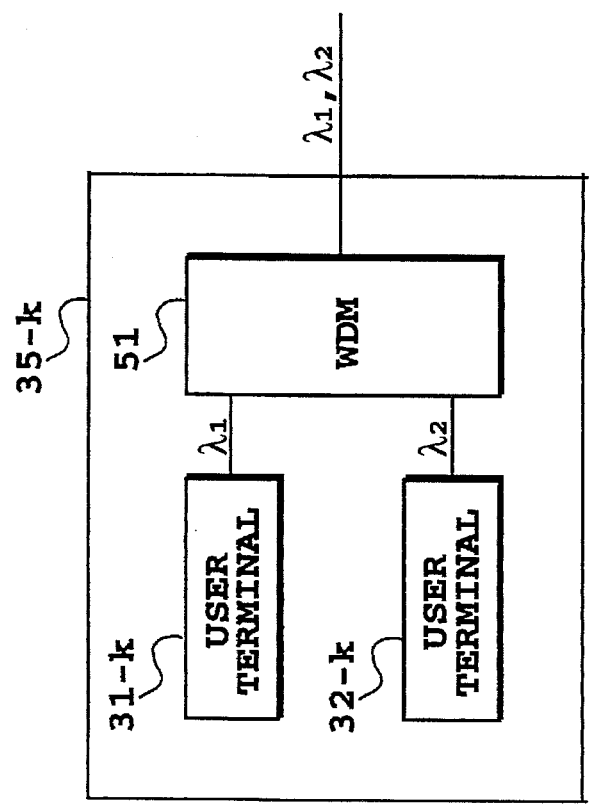

The two systems 1 and 2 are integrated into one system with their corresponding user terminals 31-k and 32-k (k=1, 2, 3 and 4) being combined into single user terminals 35-k as shown in FIG. 9A. A user terminal as the user terminal 35-k, which includes two or more user terminals, is called a multi-service user terminal. The multi-service user terminal includes a WDM device 51 which splits received optical signal in accordance with wavelengths, and combines transmitted optical signals of different wavelengths to transmit them to a center terminal.

When integrating the two systems 1 and 2, the system 1 is resolved as shown in FIG. 6C. Specifically, the 1×8 optical splitter 14 is replaced by two 1×4 optical splitters 15-1 and 15-2, and a 1×2 optical splitter 16, and the user terminals 31-1–31-4 to be combined with the user terminals 32-1–32-4 of the system 2 to form multiservice user terminals are connected to the 1×4 optical splitter 15-1, and the remaining user terminals 31-5–31-8 are connected to the optical splitter 15-2.

Next, a WDM device 17 is inserted at the input port A of the 1×4 optical splitters 15-1 and 15-2 to which the user terminals 31-1–31-4 and 32-1–32-4 to be combined into multi-service user terminals are connected. Specifically, the output port of the WDM device 17 is connected to the input port of the optical splitter 15-1, a first input port of the WDM device 17 is connected to the input/output port of a center terminal 22 of the system 2, and a second input port of the WDM device 17 is connected to a first output port of the 1×2 optical splitter 16. Thus, the four multi-service user terminals 35-1–35-4 are connected to the center terminal 22 of the system 2 and the center terminal 21 of the system 21. They are connected to the center terminal 22 through the 1×4 optical splitter 15-1 and the WDM device 17, and to the center terminal 21 through the 1×4 optical splitter 15-1, the WDM device 17 and the 1×2 optical splitter 16. In addition, the user terminals 31-5–31-8 are connected to the center terminal 21 of the system 1 through the 1×4 optical splitter 15-2 and the 1×2 optical splitter 16.

According to the present embodiment, the loss from the center terminal 21 of the system 1 to the user terminals 31-1–31-8 are identical to the loss when the 1×8 optical splitter 14 is employed. In addition, the loss from the center terminal 22 of the system 2 to the user terminals 32-1–32-4 are identical to the loss when the 1×4 optical splitter 15 is employed. In other words, the maximum splitting numbers of respective systems 1 and 2 are kept within the allowed losses of the systems.

This will be described in more detail using expressions. It is assumed that the center terminal 21 outputs an optical signal with a wavelength of $\lambda_1$ and a power of $P_1$, and the center terminal 22 outputs an optical signal with a wavelength of $\lambda_2$ and a power of $P_2$. Furthermore, it is assumed that attenuation factors due to the split losses (including transmission losses) of the 1×2 optical splitter 16 and the 1×4 optical splitter 15-1 are $A_1$ and $A_2$, respectively, and that the minimum receiving levels of the user terminals 31-k and 32-k are $R_1$ and $R_2$, respectively. Here, the attenuation factor $A_1$ is determined by the splitting loss of the 1×2 optical splitter 16 plus the transmission loss from the center terminal 21 to the splitter 16, and the attenuation factor $A_2$ is determined by the splitting loss of the 1×4 optical splitter 15-1 plus the transmission loss from the 1×2 optical splitter 16 to the user terminal 35-k. In this case, the optical signal of wavelength $\lambda_1$ output from the center terminal 21 of the system 1 reaches the user terminals 31-k at a power of $P_1 \times A_1 \times A_2$. Likewise, the optical signal of wavelength $\lambda_2$ output from the center terminal 22 of the system 2 reaches the user terminals 32-k at a power of $P_2 \times A_2$. Accordingly, the following expressions must be satisfied.

$$P_1 \times A_1 \times A_2 \geq R_1$$

$$P_2 \times A_2 \geq R_2$$

Since the attenuation factor $A_1 \times A_2$ due to the loss through the 1×2 optical splitter 16 and the 1×4 optical splitter 15-1 corresponds to the loss through the 1×8 optical splitter 14 of the system 1, and the attenuation factor $A_2$ due to the loss through the 1×4 optical splitter 15-1 corresponds to the loss through the 1×4 optical splitter 15 of the system 2, the above expressions are satisfied. Thus, the maximum splitting numbers (losses) are maintained within the allowed losses of respective systems.

EMBODIMENT 2

Figure 7:
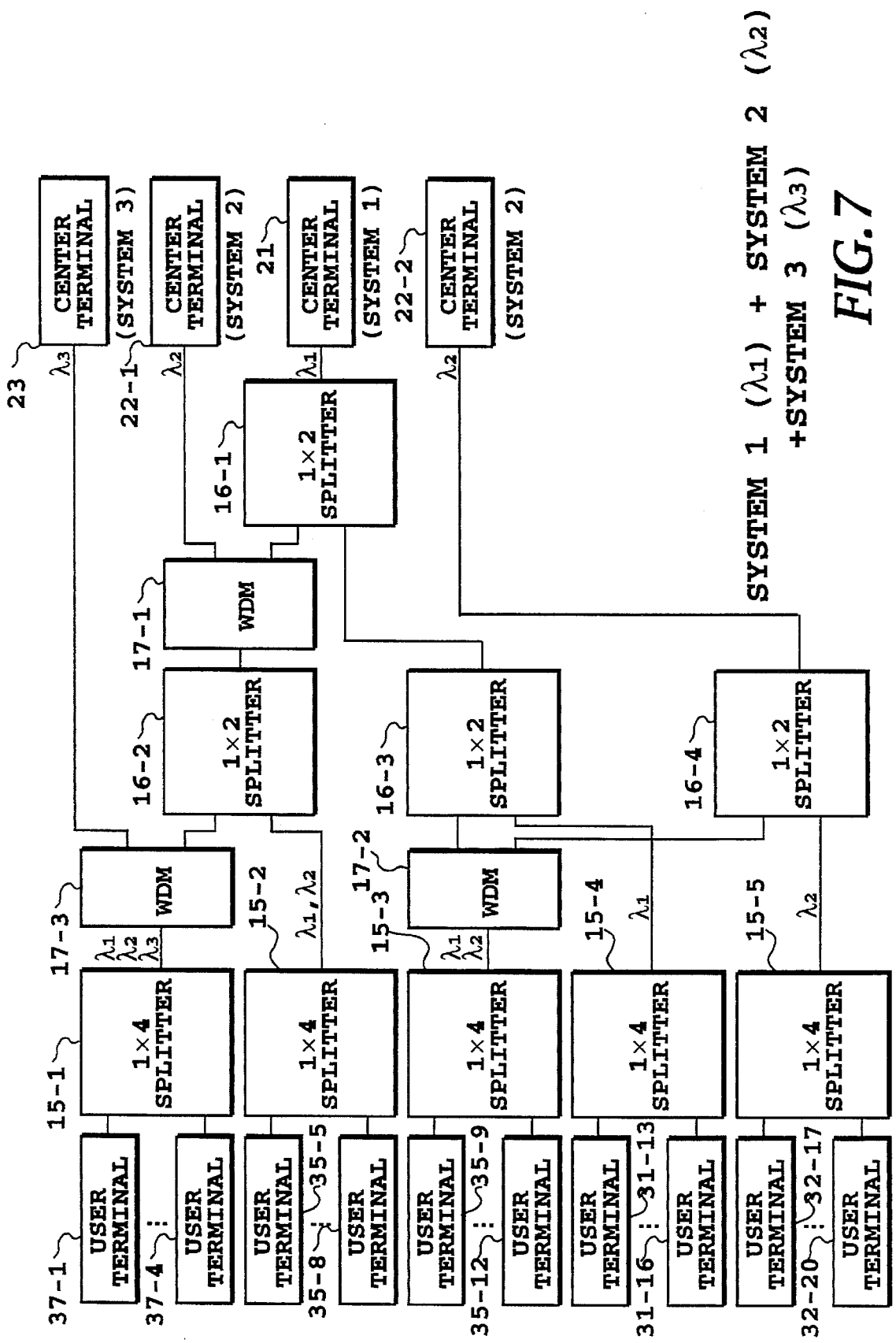
FIG. 7 is a block diagram showing a second embodiment of an optical WDM transmission system in accordance with the present invention.

FIG. 7 is a block diagram showing a second embodiment of an optical WDM transmission system in accordance with the present invention. In this embodiment, a system 1 using a first optical signal (wavelength $\lambda_1$) as shown in FIG. 8A, a system 2 using a second optical signal (wavelength $\lambda_2$) as shown in FIG. 8B and a system 3 using a third optical signal (wavelength $\lambda_3$) as shown in FIG. 8C are integrated into a single system by means of WDM. The system 1 has a configuration in which 16 user terminals 31-1–31-16 are connected to a center terminal 21 through 1×16 optical splitter 19. The system 2 has a configuration in which 16 user terminals 32-1–32-8, and 32-9–32-12 and 32-17–32-20 are connected to center terminals 22-1 and 22-2 through two 1×8 optical splitters 14-1 and 14-2, respectively. Furthermore, the system 3 has a configuration in which four user terminals 33-1–33-4 are connected to a center terminal 23 through 1×4 optical splitter 15.

The three systems 1, 2 and 3 are integrated into one system. In this case, the counterpart user terminals 31-k, 32-k and 33-k (k=1–4) of the three systems 1, 2 and 3 are combined into single multi-service user terminals 37-k, respectively, as shown in FIG. 9B. In addition, the counterpart user terminals 31-k and 32-k (k=5–12) of the two systems 1 and 2 are combined into single multiservice user terminals 35-k as shown in FIG. 9A. They are of course can be used separately without being combined.

Figure 10:
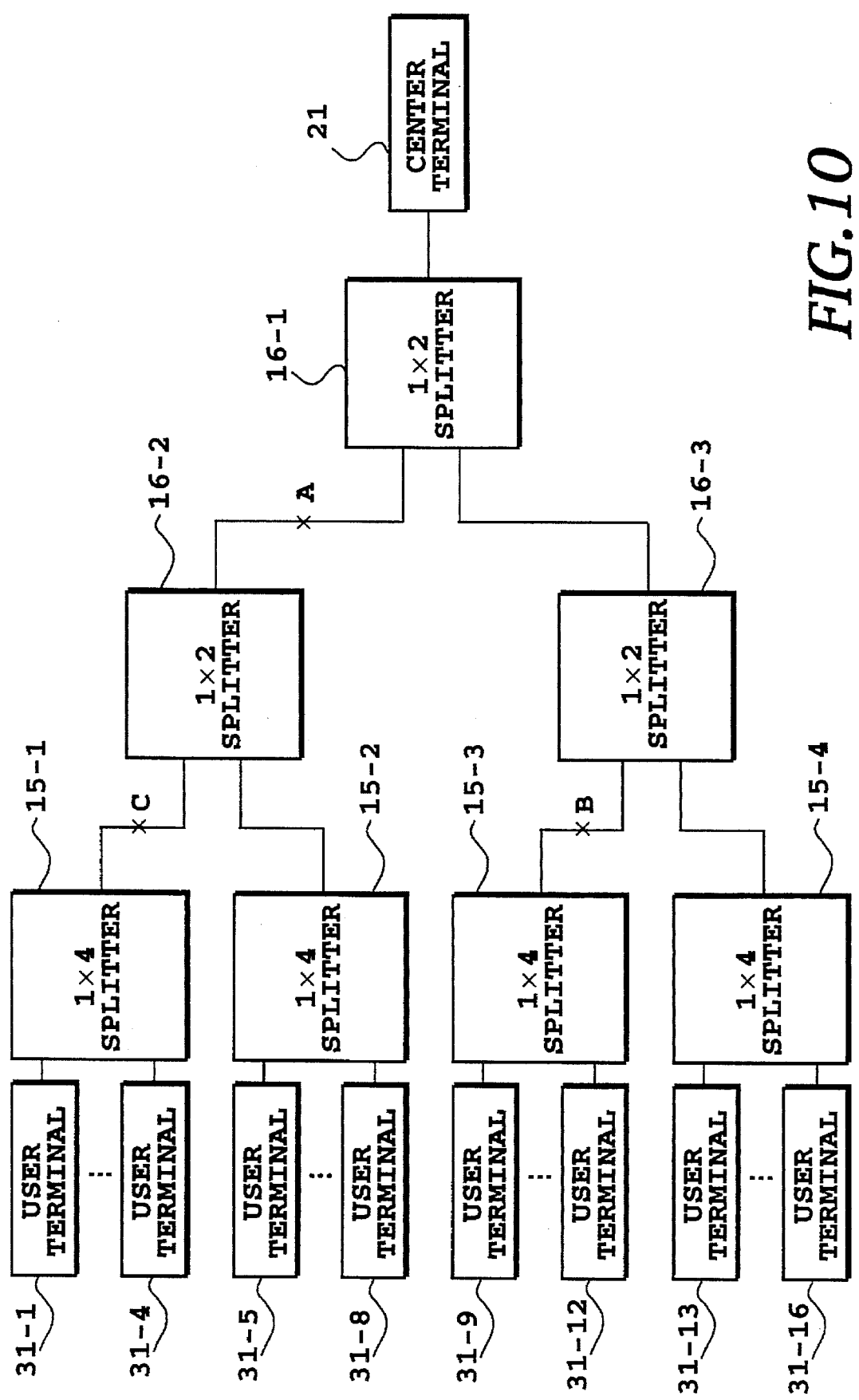
FIGS. 10 and 11 are block diagrams showing resolved systems 1 and 2 of the second embodiment, respectively.

The procedure of the integration is as follows. First, the system 1 is resolved as shown in FIG. 10. Specifically, the 16 user terminals 31-1–31-16 are separated into every four groups, and the groups are connected to 1×4 optical splitters 15-1–15-4, respectively. Then, the two optical splitters 15-1 and 15-2 are connected to the center terminal 21 through 1×2 optical splitters 16-2 and 16-1, and the remaining optical splitters 15-3 and 15-4 are connected to the center terminal 21 through 1×2 optical splitters 16-3 and 16-1.

Figure 11:
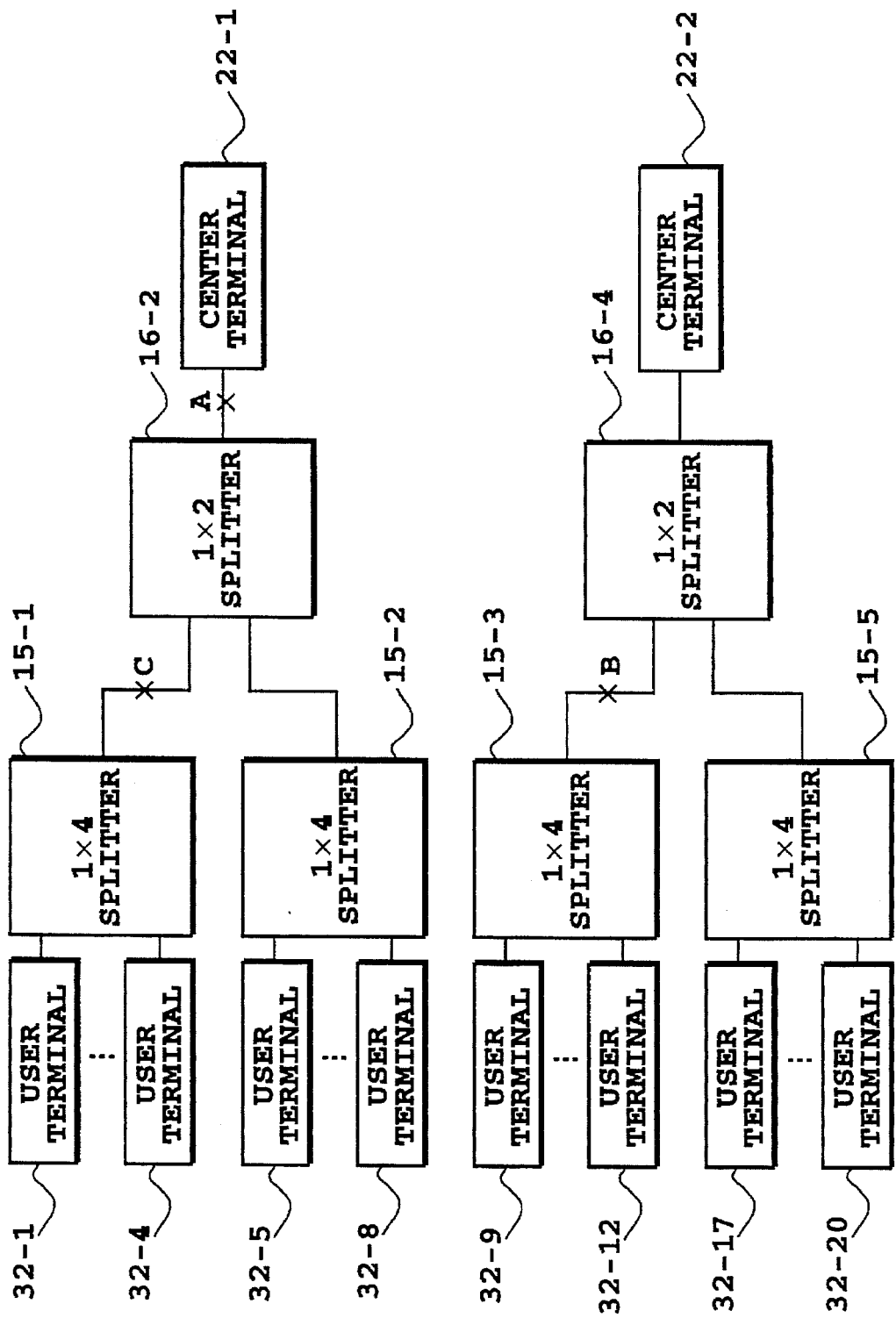

On the other hand, the system 2 is resolved as shown in FIG. 11. Specifically, the 12 user terminals 32-1–32-12 are grouped every four units, and the groups are connected to 1×4 optical splitters 15-1–15-3, respectively. The remaining user terminals 32-17–32-20 are connected to a 1×4 optical splitter 15-5. Then, the two 1×4 optical splitters 15-1 and 15-2 are connected to the center terminal 22-1 through 1×2 optical splitters 16-2, and the remaining two 1×4 optical splitters 15-3 and 15-4 are connected to the center terminal 22-2 through 1×2 optical splitters 16-4. The system 3 is not resolved.

Next, a WDM device 17-1 is inserted at the input port A of the 1×2 optical splitter 16-2 (see, FIGS. 10 and 11) to which the eight multi-service user terminals 37-1–35-8 are accommodated as shown in FIGS. 7. These multi-service user terminals are provided with two or more types of services from the systems 1-3. The input ports of the WDM device 17-1 are connected to the center terminal 22-1 of the system 2, and to a first output port of the 1×2 optical splitter 16-1. Likewise, a WDM device 17-2 is inserted at the input port B of the 1×4 optical splitter 15-3 to which the remaining four multi-service user terminals 35-9–35-12 are accommodated. These multi-service user terminals are provided with two types of services from the systems 1 and 2. The input ports of the WDM device 17-2 are connected to first output ports of the 1×2 optical splitters 16-3 and 16-4. Furthermore, a WDM device 17-3 is inserted at the input port C of the 1×4 optical splitter 15-1 to which the four multi-service user terminals 37-1–37-4 are connected. These multi-service user terminals are provided with three types of services from the systems 1, 2 and 3. The input ports of the WDM device 17-3 are connected to the center terminal 23 of the system 3, and to a first output port of the 1×2 optical splitter 16-2. Thus, the system as shown in FIG. 7 is formed. The user terminals 31-13–31-16 which are connected only to the system 1 are connected to the center terminal 21 of the system 1 through the 1×4 optical splitter 15-4, and 1×2 optical splitters 16-3 and 16-1. In addition, the user terminals 32-17–32-20 which are connected only to the system 2 are connected to the center terminal 22-2 of the system 2 through the 1×4 optical splitter 15-5 and 1×2 optical splitter 16-4.

According to the present embodiment, the loss from the center terminal 21 of the system 1 to the user terminals 31-1–31-16 are identical to the loss when the 1×16 optical splitter 19 is employed. The loss from the center terminals 22-1 and 22-2 of the system 2 to the user terminals 32-1–32-12 and 32-17–32-20 are identical to the loss when the 1×8 optical splitters 14-1 and 14-2 are employed. Furthermore, the loss from the center terminal 23 of the system 3 to the user terminals 33-1–33-4 are identical to the loss when the 1×4 optical splitter 15 is employed. In other words, the maximum splitting numbers of respective systems 1, 2 and 3 are kept within the allowed losses of the systems.

EMBODIMENT 3

Figure 12:
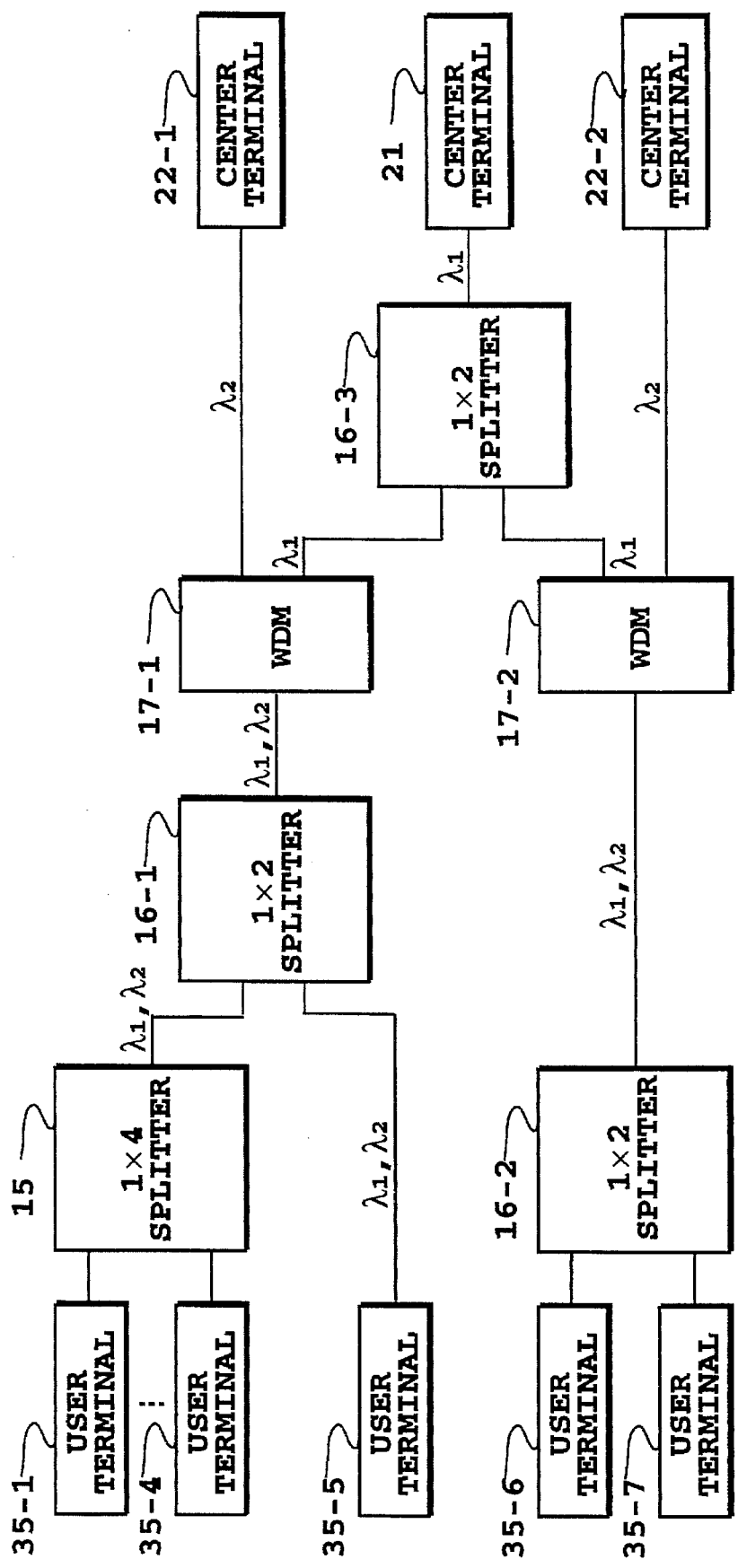
FIG. 12 is a block diagram showing a third embodiment of an optical WDM transmission system in accordance with the present invention.

FIG. 12 is a block diagram showing a third embodiment of an optical WDM transmission system in accordance with the present invention. In this embodiment, a system 1 using a first optical signal (wavelength $\lambda_1$) as shown in FIG. 13A, and a system 2 using a second optical signal (wavelength $\lambda_2$) as shown in FIG. 13B are integrated into a single system by means of WDM. The system 1 has a configuration in which four user terminals 31-1–31-4 are connected to a 1×4 optical splitter 15, and the input port of the splitter 15 and the remaining three user terminals 31-5–31-7 are connected to a center terminal 21 through 1×4 optical splitter 16. The system 2, on the other hand, has a configuration in which four user terminals 32-1–32-4 are connected to a 1×4 optical splitter 15, and the input port of the splitter 15 and a user terminal 32-5 are connected to a center terminal 22-1 through a 1×2 optical splitter 16-1, and in which the remaining two user terminals 32-6 and 32-7 are connected to a center terminal 22-2 through 1×2 optical splitter 16-2.

In this embodiment, the two systems 1 and 2 are integrated into one system with the counterpart user terminals 31-k and 32-k (k=1–7) of the two systems 1 and 2 being combined into single multi-service user terminals 35-k. In other words, the user terminals 31-1–31-5 of the system 1 and the user terminals 32-1–32-5 of the system 2 are combined respectively to form multi-service user terminals 35-1–35-5 which are provided with services from the center terminal 21 of the system 1 and the center terminal 22-1 of the system 2. In addition, the user terminals 31-6 and 31-7 of the system 1 and the user terminals 32-6 and 32-7 of the system 2 are combined respectively to form multi-service user terminals 35-6 and 35-7 which are provided with services from the center terminal 21 of the system 1 and the center terminal 22-2 of the system 2.

Figure 13C:
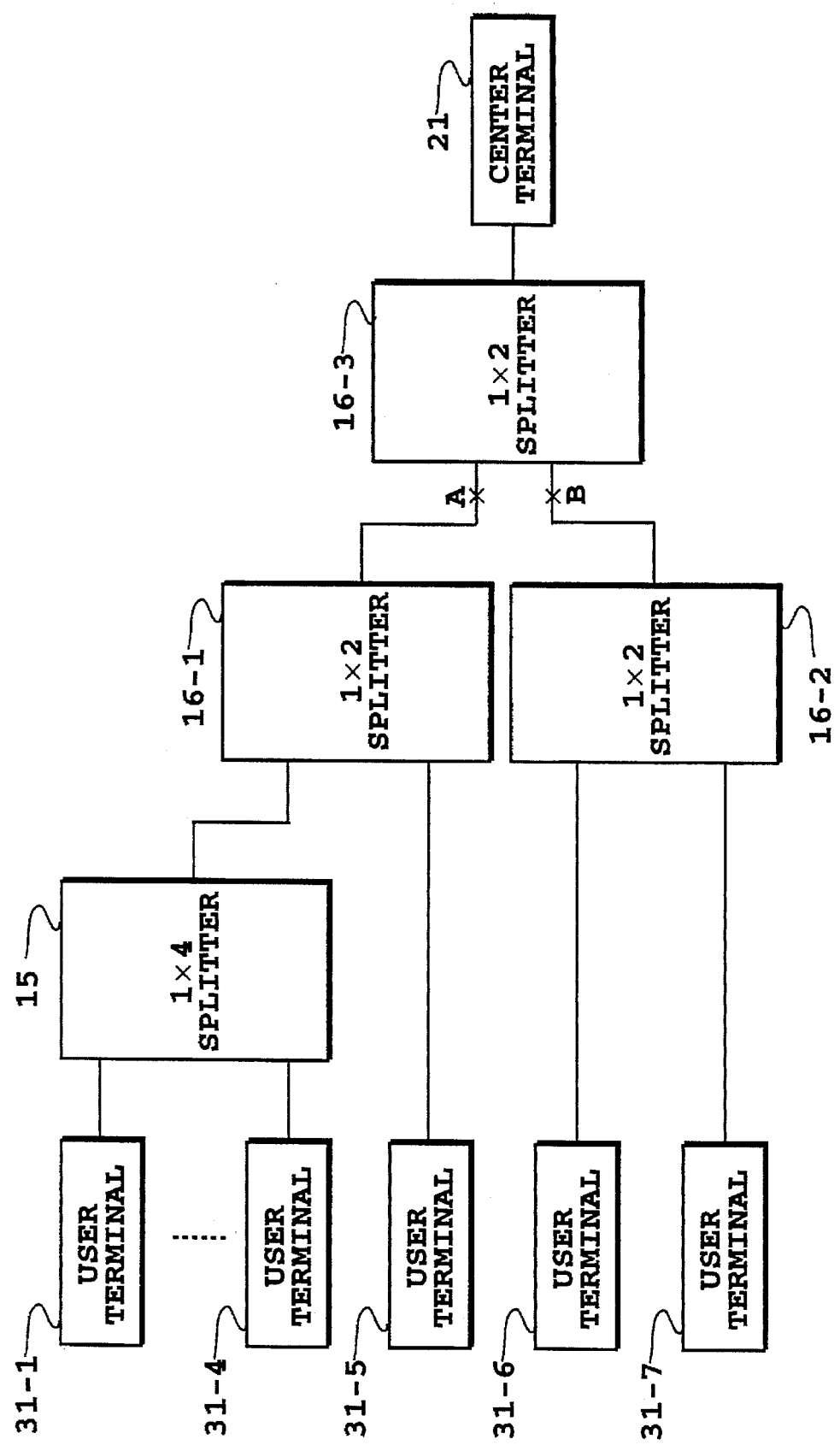

In integrating the two systems 1 and 2, the 1×4 optical splitter 16 of the system 1 is replaced with three 1×2 optical splitters 16-1, 16-2 and 16-3 as shown in FIG. 13C. Next, a WDM device 17-1 is inserted at the input port A of the 1×2 optical splitter 16-1 which accommodates the multi-service user terminals 35-1–35-5 as shown in FIG. 12. More specifically, a first input port of the WDM device 17-1 is connected to the center terminal 22-1 of the system 2, and a second input port of the WDM device 17-1 is connected to a first output port of the 1×2 optical splitter 16-3. The output port of the WDM device 17-1 is connected to the input port of the 1×2 optical splitter 16-1. In addition, a WDM device 17-2 is inserted at the input port B of the 1×2 optical splitter 16-2 to which the multi-service user terminals 35-6 and 35-7 are connected. Specifically, the input ports of the WDM device 17-2 are connected to the input/output port of the center terminal 22-2 of the system 2, and to a second output port of the 1×2 optical splitters 16-3. The output port of the WDM device 17-2 is connected to the input port of the 1×2 optical splitter 16-2, thereby resulting in the system as shown in FIG. 12.

According to the present embodiment, the loss from the center terminal 21 of the system 1 to the user terminals 31-1–31-4 is identical to the loss when a 1×16 optical splitter is employed. The loss from the center terminal 21 of the system 1 to the user terminals 31-5–31-7 is identical to the loss when the 1×4 optical splitter 16 is employed. Furthermore, the loss from the center terminal 22-1 of the system 2 to the user terminals 32-1–32-4 is identical to the loss when a 1×8 optical splitter is employed, and the loss from the center terminal 22-2 of the system 2 to the user terminals 32-5–32-7 are identical to the loss when the 1×2 optical splitters 16-1 and 16-2 are employed. In other words, the maximum splitting numbers of respective systems 1 and 2 are kept within the allowed losses of the systems.

Figure 14A:
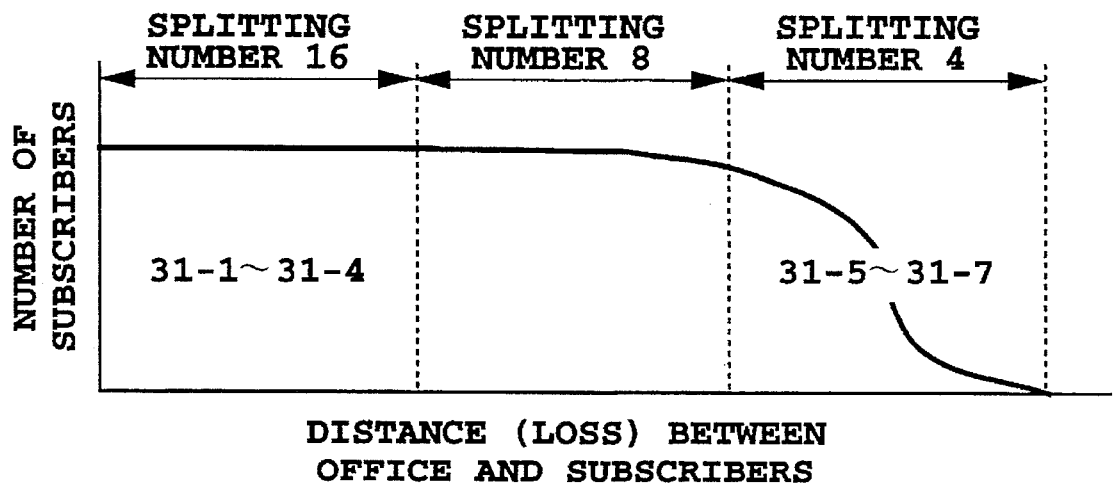
FIGS. 14A and 14B are graphs illustrating relationships between subscriber distribution and possible splitting numbers of the systems 1 and 2 integrated in the third embodiment.
Figure 14B:
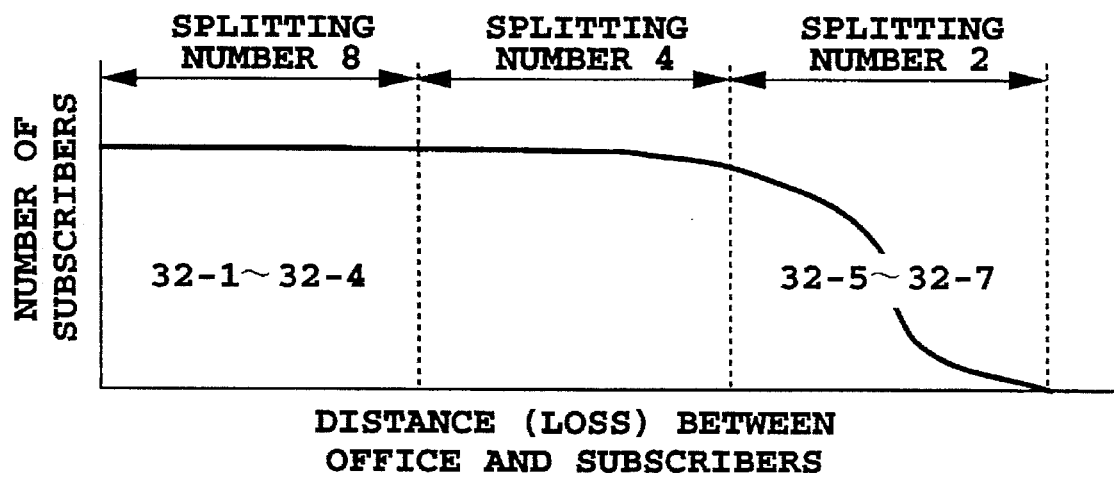

FIGS. 14A and 14B are graphs illustrating relationships between subscriber distribution and possible splitting numbers in the systems 1 and 2. The abscissas of the graph indicate the loss between the center terminal and the user terminals, and the ordinates represent the number of users. In FIG. 14A, the possible splitting number of the user terminals 31-1–31-4 are 16, and that of the user terminals 31-5–31-7 are four. In FIG. 14B, the possible splitting number of the user terminals 32-1–32-4 are eight, and that of the user terminals 32-5–32-7 are two. The system of FIG. 12 satisfies these possible splitting numbers.

Figure 15:
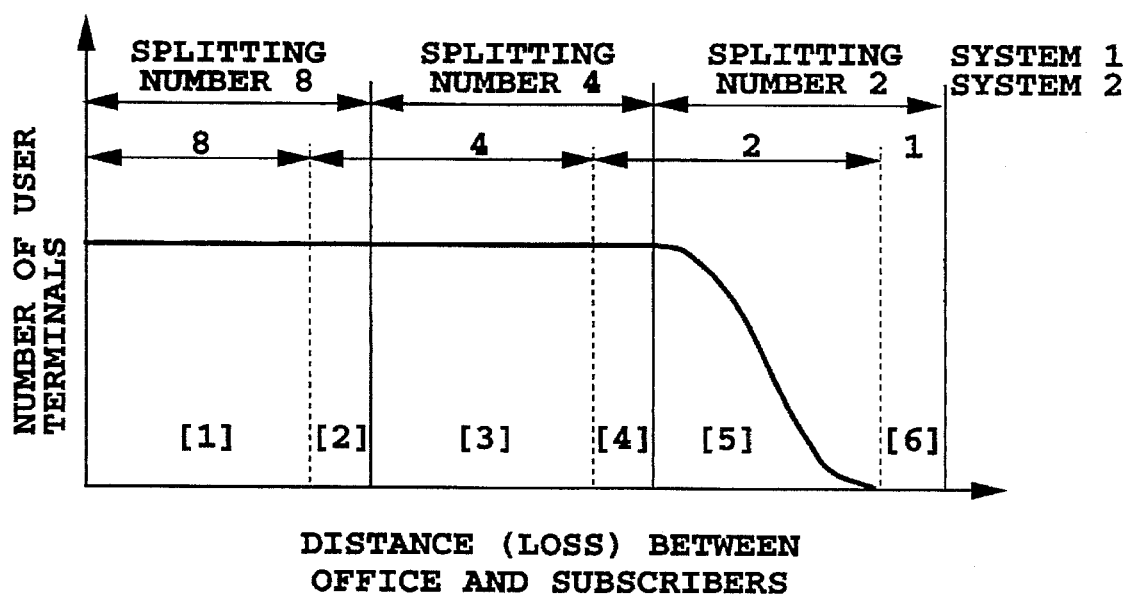
FIG. 15 is a graph for explaining a method for configuring a system when areas of possible splitting numbers differ in systems 1 and 2 to be integrated.

FIG. 15 is a diagram showing transmission loss from two systems 1 and 2 to user terminals, and distribution of the number of the user terminals. Areas divided by vertical solid lines indicate possible splitting numbers of the system 1, and areas separated by vertical broken lines show possible splitting numbers of the system 2. As shown in this figure, the areas of the possible splitting numbers may vary depending on the systems even if user terminals are identical. A method for integrating such systems 1 and 2 into a single system by using WDM will now be described.

The possible splitting numbers of the two systems 1 and 2 are equal in areas [1], [3] and [5]. In this case, the optimum configuration is implemented by connecting a WDM device between a center terminal and an optical splitter to which user terminals are connected, as in the above described embodiments.

On the other hand, the possible splitting number of the system 1 is twice that of the system 2 in the areas [2], [4] and [6]. In this case, an optical splitter, to which user terminals of the system 1 is connected, is replaced by two optical splitters as in the first embodiment as shown in FIGS. 5–6C, and the new two optical splitters are connected to a center terminal through a 1×2 optical splitter. Then, a WDM device is placed between the 1×2 optical splitter and one of the two new optical splitters, thereby resulting in the optimum configuration.

When the allowed losses of systems 1 and 2 greatly differ, they may not share an area in which the possible splitting number is identical. In this case, the optimum configuration can be implemented by cascading optical splitters whose splitting number is $2^n$, and by placing a WDM device at a position at which the splitting number to user terminals are equal as in the second embodiment shown in FIG. 7.

Figure 16A:
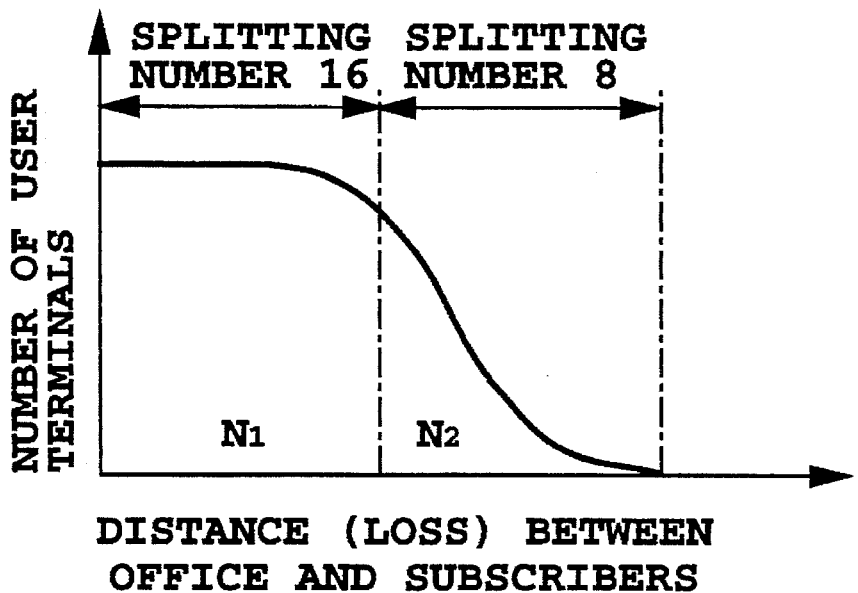
Figure 16B:
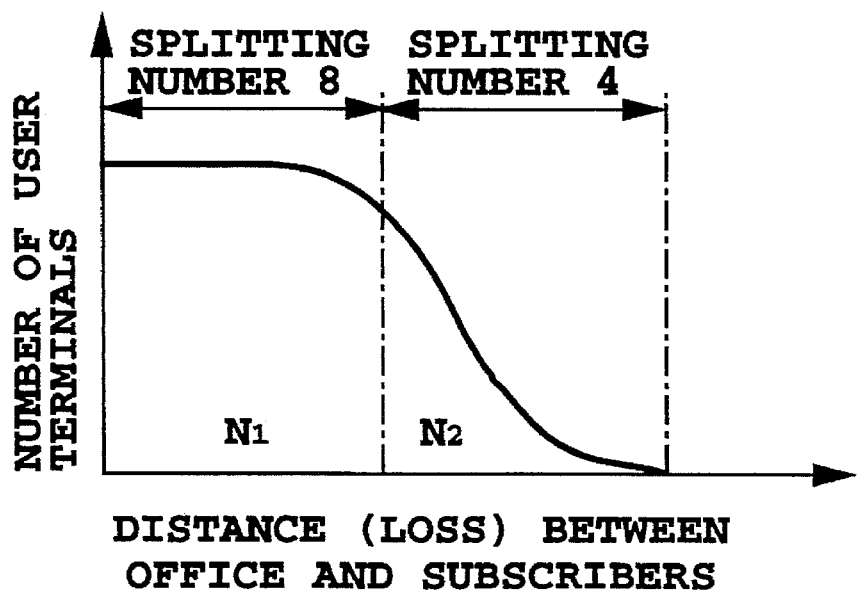

FIGS. 16A–16D are diagrams for explaining the effect of the present invention. FIGS. 16A and 16B show the relationships between transmission losses and possible splitting numbers. In system 1, there are $N_1$ user terminals in the area where the possible splitting number is 16, and $N_2$ user terminals in the area where the possible splitting number is 8. In system 2, there are $N_1$ user terminals in the area where the possible splitting number is 8, and $N_2$ user terminals in the area where the possible splitting number is 4.

Figure 16C:
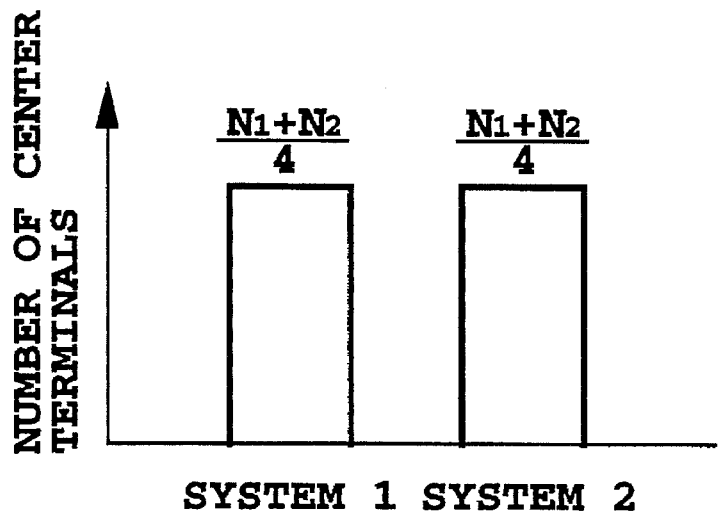

When the two systems 1 and 2 are integrated into a single system by means of WDM, the conventional method employs 1×4 optical splitters in accordance with the system 2 having smaller splitting numbers. As a result, the number of center terminals becomes $(N_1+N_2)/4$ for each of the systems 1 and 2 as shown in FIG. 16C.

Figure 16D:
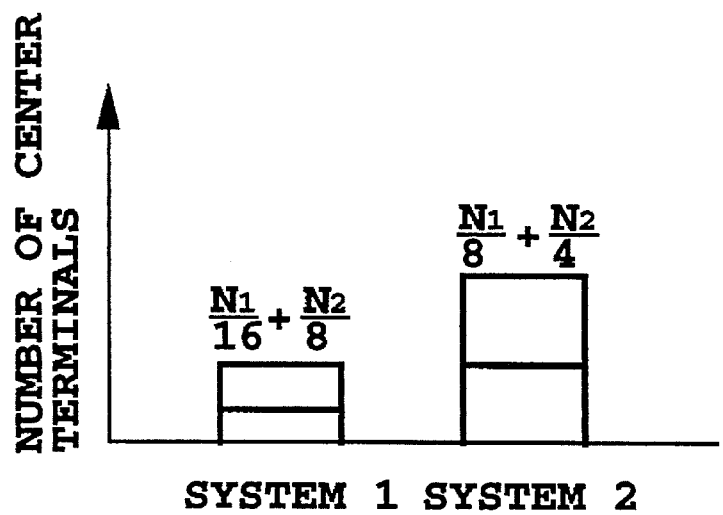

In contrast, the present invention utilizes the maximum splitting numbers. Therefore, the number of center terminals of the system 1 is $N_1/16+N_2/8$, and that of the system 2 is $N_1/8+N_2/4$ as shown in FIG. 16D. As a result, the number of user terminals per center terminal increases, and the number of the center terminals decreases, thereby achieving an economical system configuration. For example, when $N_1=80$ and $N_2=32$, the number of center terminals is 28 for each of the systems 1 and 2 in the conventional method. In contrast, it is 9 for the system 1, and 18 for the system 2 in the system in accordance with the present invention. In other words, according to the present invention, the number of center terminals is about ⅓ in the system 1, and ⅔ in the system 2 as compared with the conventional method.

EMBODIMENT 4

Figure 17:
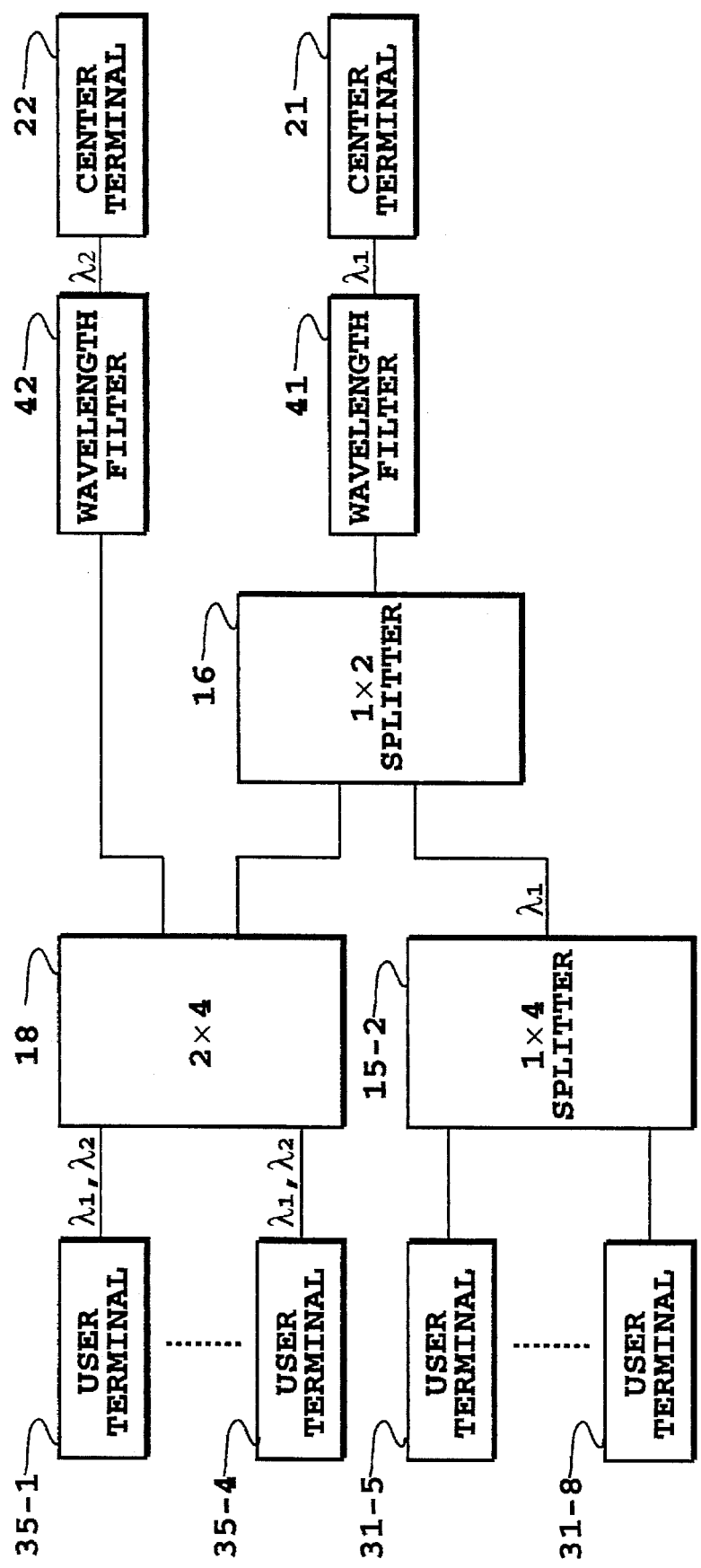
FIG. 17 is a block diagram showing a fourth embodiment of an optical WDM transmission system in accordance with the present invention.

FIG. 17 is a block diagram showing a fourth embodiment of an optical WDM transmission system in accordance with the present invention. This system corresponds to the first embodiment as shown in FIG. 5. The embodiment differs from the first embodiment in the following.

(1) The WDM device 17 and the 1×4 optical splitter 15-1 of the first embodiment are replaced by a 2×4 optical coupler 18.

(2) Wavelength filters 41 and 42 are connected to the input/output ports of the center terminals 21 and 22, respectively.

A fiber coupler or an optical waveguide with a wide wavelength range can be employed as the 2×4 optical coupler 18. The wavelength filter 41 passes only an optical signal with a wavelength of $\lambda_1$, and the wavelength filter 42 passes only an optical signal with a wavelength of $\lambda_2$. These wavelength filters, which can be set in the center terminals, are provided because the 2×4 optical coupler 18 lacks splitting function.

This configuration can achieve the same effect and advantages as those of the first embodiment.

EMBODIMENT 5

Figure 18:
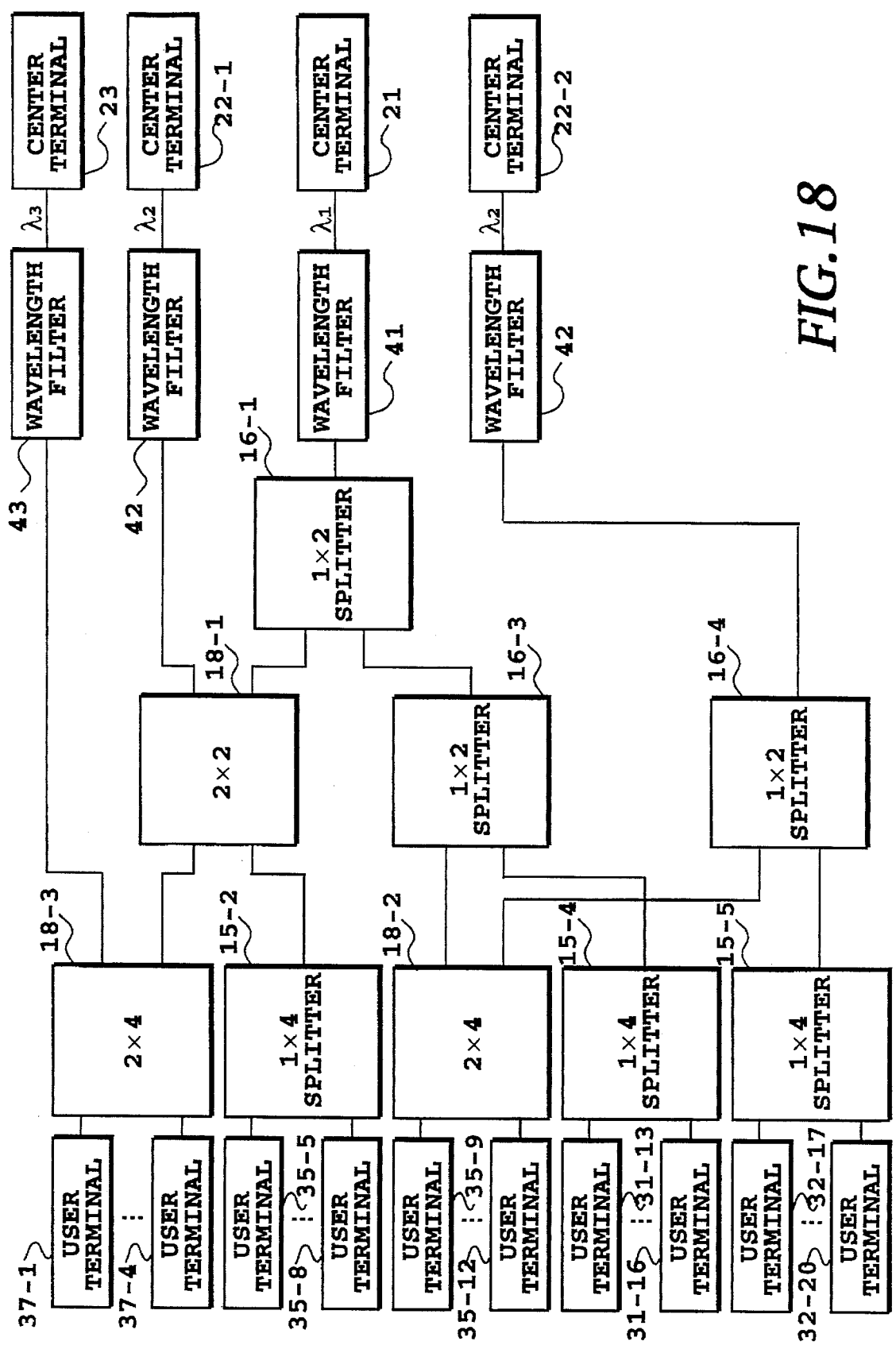
FIG. 18 is a block diagram showing a fifth embodiment of an optical WDM transmission system in accordance with the present invention.

FIG. 18 is a block diagram showing a fifth embodiment of an optical WDM transmission system in accordance with the present invention. This system corresponds to the second embodiment as shown in FIG. 7. The embodiment differs from the second embodiment in the following.

(1) The WDM device 17-1 and the 1×2 optical splitter 16-2 of the second embodiment are replaced by a 2×2 optical coupler 18-1.

(2) The WDM device 17-2 and the 1×4 optical splitter 15-3 are replaced by a 2×4 optical coupler 18-2.

(3) The WDM device 17-3 and the 1×4 optical splitter 15-1 are replaced by a 2×4 optical coupler 18-3.

(2) Wavelength filters 41, 42 and 43 are connected to the input/output ports of the center terminals 21, 22-1 and 22-2, respectively. The wavelength filter 43 passes only an optical signal with a wavelength of $\lambda_3$.

This configuration can achieve the same effect and advantages as those of the second embodiment.

EMBODIMENT 6

Figure 19A:
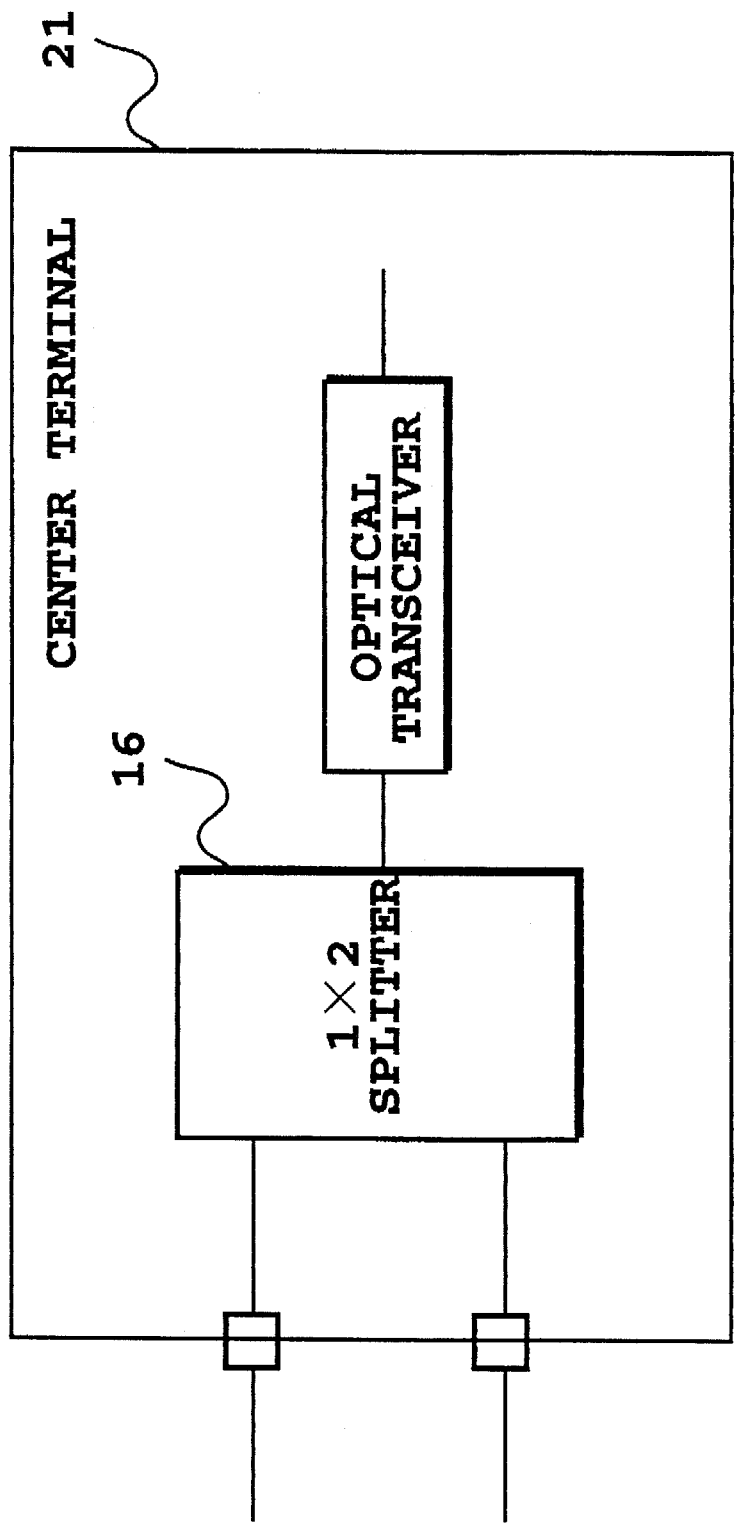
FIGS. 19A–19C are block diagrams showing major portions of a sixth embodiment of an optical WDM transmission system in accordance with the present invention.
Figure 19B:
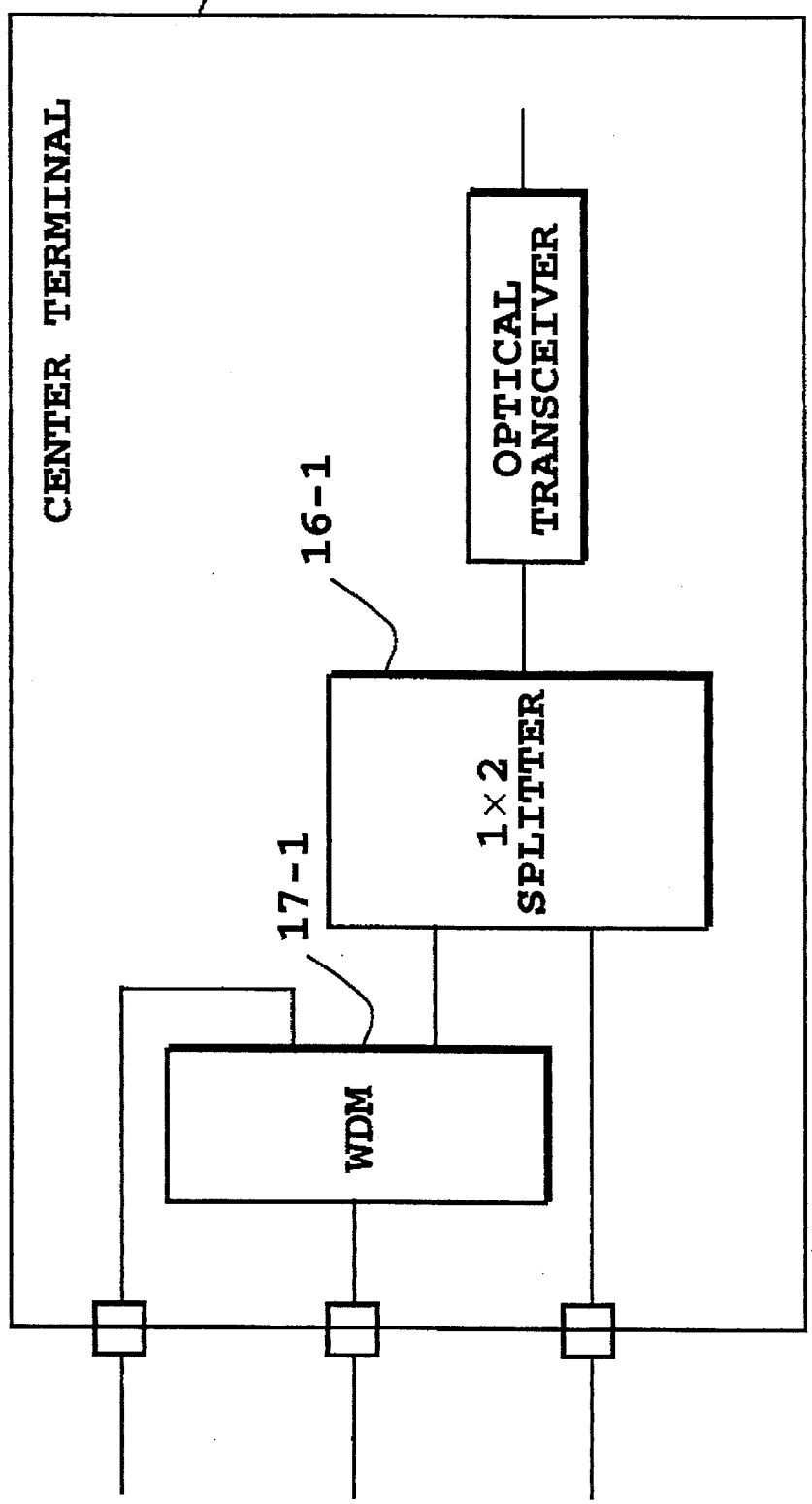
Figure 19C:
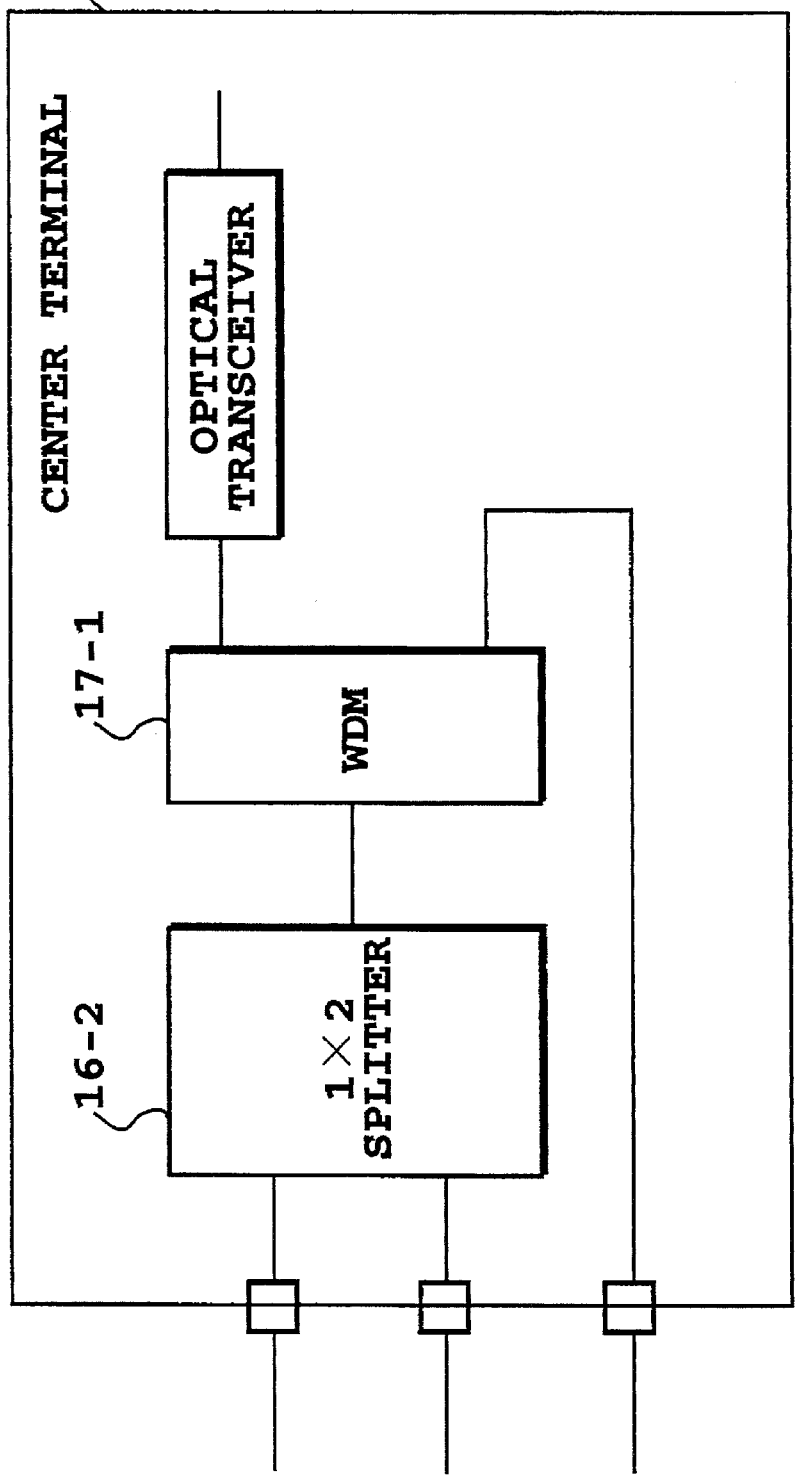

FIGS. 19A–19C are block diagrams showing major portions of a sixth embodiment of an optical WDM transmission system in accordance with the present invention.

In FIG. 19A, the center terminal 21 and the 1×2 optical splitter 16 in FIG. 5 are combined, thereby resulting in a new center terminal 21.

In FIG. 19B, the center terminal 21, the 1×2 optical splitter 16-1 and the WDM device 17-1 in FIG. 7 are combined, thereby resulting in a new center terminal 21.

In FIG. 19C, the center terminal 22-1, the WDM device 17-1 and the 1×2 optical splitter 16-2 in FIG. 7 are combined, thereby resulting in a new center terminal 22-1.

Using these center terminals will facilitate the system arrangement in accordance with of the present invention.

EMBODIMENT 7

Figure 20:
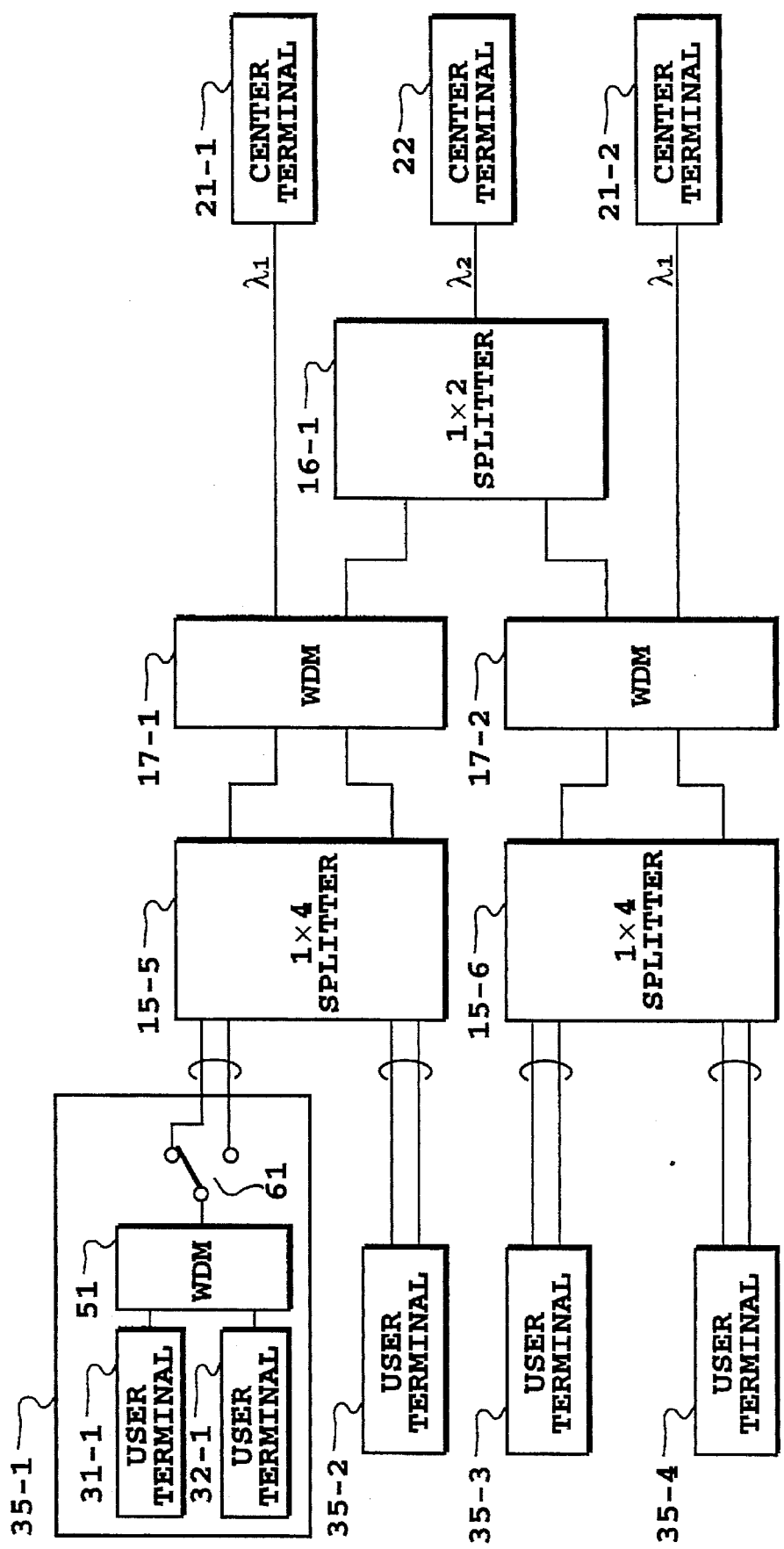
FIG. 20 is a block diagram showing a seventh embodiment of an optical WDM transmission system in accordance with the present invention.

FIG. 20 is a block diagram showing a seventh embodiment of an optical WDM transmission system in accordance with the present invention.

In this figure, an optical signal of wavelength $\lambda_1$ output from a center terminal 21-1 of a system 1 is supplied to two multi-service user terminals 35-1–35-2 through a WDM device 17-1 and a 1×4 optical splitter 15-5. Likewise, an optical signal of wavelength $\lambda_1$ output from another center terminal 21-2 of the system 1 is supplied to two multi-service user terminals 35-3–35-4 through a WDM device 17-2 and a 1×4 optical splitter 15-6. In addition, an optical signal of wavelength $\lambda_2$ output from an center terminal 22 of a system 2 is supplied to four multi-service user terminals 35-1–35-4 through a 1×2 optical splitter 16-1, WDM devices 17-1 and 17-2, and 1×4 optical splitters 15-5 and 15-6. Each multi-service user terminal 35-k (k=1–4) includes two types of user terminals 31-k and 32-k, which transmit and receive the optical signals of wavelength $\lambda_1$ and $\lambda_2$, respectively.

This embodiment is characterized in that duplication is adopted between the user terminals 35-1–35-4 and the WDM devices 17-1 and 17-2, and one of the transmission paths is selected with a switch 61 provided in the user terminals. This configuration can improve the reliability of the system.

EMBODIMENT 8

Figure 21:
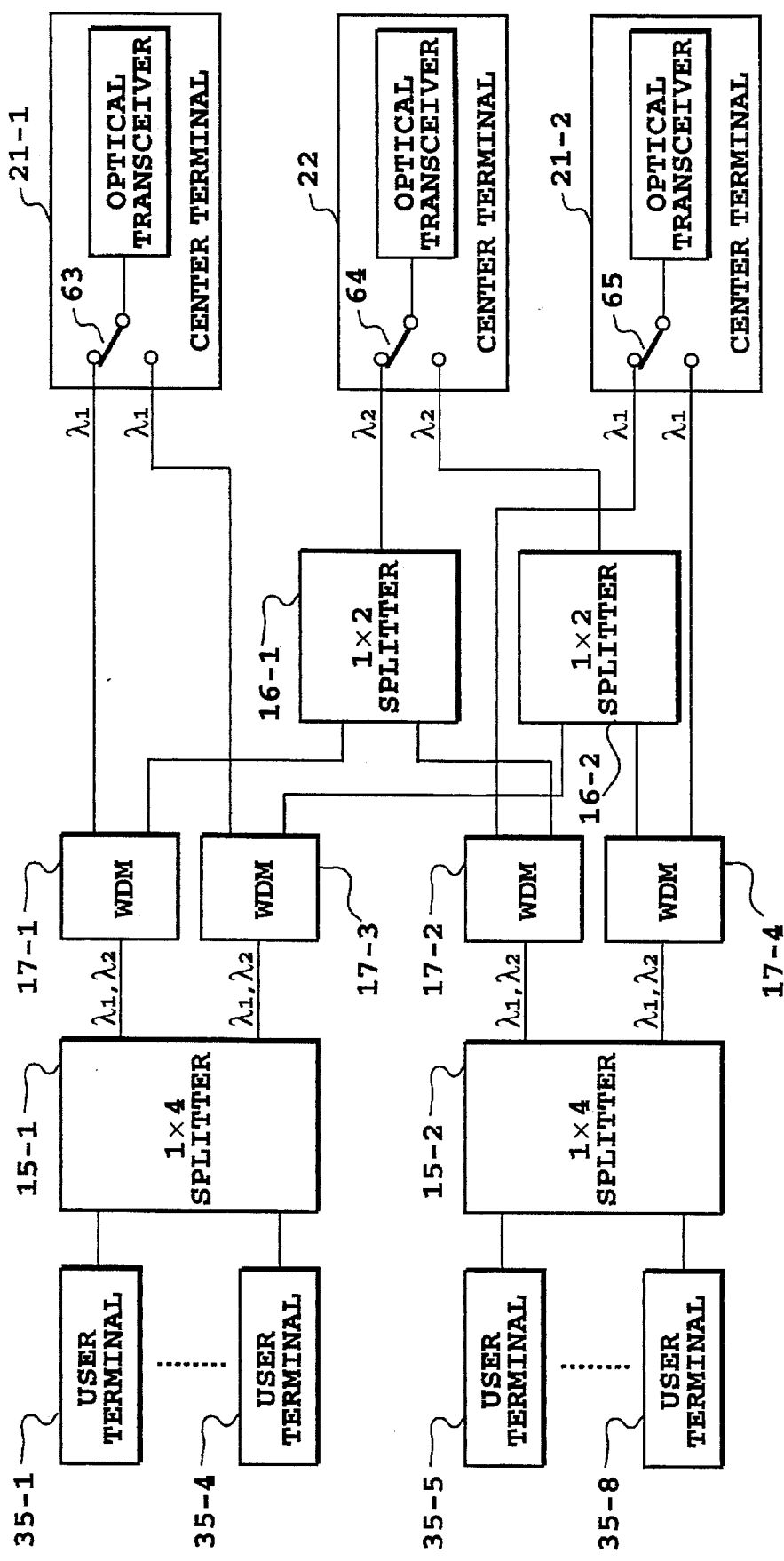
FIG. 21 is a block diagram showing an eighth embodiment of an optical WDM transmission system in accordance with the present invention.

FIG. 21 is a block diagram showing an eighth embodiment of an optical WDM transmission system in accordance with the present invention.

This embodiment duplicates transmission lines from the center terminals to the WDM devices in a system similar to that of FIG. 20. The center terminals 21-1, 21-2 and 22 include transfer switches 63–65, respectively, and select one of the duplicated paths, thereby improving the system reliability.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical WDM (Wavelength Division Multiplexing) transmission system comprising:

a first center terminal for outputting a first optical signal with a wavelength of $\lambda_1$ and an output power of $P_1$;

a second center terminal for outputting a second optical signal with a wavelength of $\lambda_2$ and an output power of $P_2$;

first optical splitting means connected to an output port of said first center terminal for splitting said first optical signal at an attenuation factor of $A_1$;

optical multiplexing means connected to an output port of said second center terminal and an output port of said first optical splitting means for combining said second optical signal and said first optical signal;

second optical splitting means connected to an output of said optical multiplexing means for splitting a multiplexed optical signal of said first optical signal and said second optical signal at an attenuation factor of $A_2$;

a first user terminal connected to an output of said second optical splitting means for receiving said first optical signal, said first user terminal having a minimum receiving level of $R_1$; and a second user terminal connected to an output of said second optical splitting means for receiving said second optical signal, said second user terminal having a minimum receiving level of $R_2$; wherein following expressions are satisfied:

$$P_1 \times A_1 \times A_2 \geq R_1, \text{ and}$$

$$P_2 \times A_2 \geq R_2.$$

2. The optical WDM transmission system as claimed in claim 1, further comprising third optical splitting means connected between said second center terminal and said optical multiplexing means for splitting said second optical signal at an attenuation factor of $A_3$, wherein following expressions are satisfied:

$$P_1 \times A_1 \times A_2 \geq R_1, \text{ and}$$

$$P_2 \times A_3 \times A_2 \geq R_2.$$

3. The optical WDM transmission system as claimed in claim 1, wherein said first optical splitting means and said second optical splitting means split an input optical signal to $2^N$ optical signals, respectively, where N is a positive integer.

4. The optical WDM transmission system as claimed in claim 1, wherein a combination of said optical multiplexing means and said second optical splitting means consist of:

multi-input port optical splitting means with its input ports being connected to the output port of said second center terminal and said output port of said first optical splitting means, respectively, and with its output ports being connected to said first user terminal and said second user terminal;

a first wavelength filter connected to the output port of said first center terminal for passing said first optical signal; and a second wavelength filter connected to the output of said second center terminal for passing said second optical signal.

5. The optical WDM transmission system as claimed in claim 1, wherein at least part of said first optical splitting means and said optical multiplexing means is mounted in said first center terminal.

6. The optical WDM transmission system as claimed in claim 1, comprising:

a duplex transmission line provided from at least one of said first center terminal and said second center terminal to said second optical splitting means; and selecting means for connecting the output port of said center terminal associated with said duplex transmission line to one of said duplex line.

7. The optical WDM transmission system as claimed in claim 1, comprising:

a duplex transmission line provided from at least one of said first user terminal and said second user terminal to said second optical splitting means; and selecting means for connecting an output port of said user terminal associated with said duplex transmission line to one of said duplex line.

8. The optical WDM transmission system as claimed in claim 1, wherein said optical multiplexing means is an optical WDM device for splitting an optical signal fed from said first user terminal and said second user terminal through said second optical splitting means into an optical signal with a wavelength of $\lambda_1$ and an optical signal with a wavelength of $\lambda_2$, and wherein at least one of a transmission line connecting said first center terminal and said first user terminal, and a transmission line connecting said second center terminal and said second user terminal is a bidirectional transmission line.

9. The optical WDM transmission system as claimed in claim 2, wherein at least one of said first optical splitting means and said third optical splitting means consists of a plurality of optical splitters connected in cascade.

10. The optical WDM transmission system as claimed in claim 8, wherein a combination of said optical multiplexing means and said second optical splitting means consist of:

multi-input port optical splitting means with its input ports being connected to the output port of said second center terminal and said output port of said first optical splitting means, and with its output ports being connected to said first user terminal and said second user terminal;

a first wavelength filter connected to the output port of said first center terminal for passing said first optical signal; and a second wavelength filter connected to the output of said second center terminal for passing said second optical signal.

11. A method for configuring an optical WDM (Wavelength Division Multiplexing) transmission system by integrating a first point-to-multipoint optical transmission system and a second point-to-multipoint optical transmission system into a point-to-multipoint optical transmission system, said first point-to-multipoint optical transmission system splitting a first optical signal with a wavelength of $\lambda_1$ output from a first center terminal, and supplying split optical signals to a plurality of first user terminals within a first allowed loss, and said second point-to-multipoint optical transmission system splitting a second optical signal with a wavelength of $\lambda_2$ output from a second center terminal, and supplying split optical signals to a plurality of second user terminals within a second allowed loss, said method comprising the steps of:

selecting a multi-service user terminal which receives both said first optical signal and said second optical signal from said first user terminals and said second user terminals;

establishing a transmission line for supplying said multi-service user terminal with an optical signal formed by splitting a third optical signal obtained by optically combining said first optical signal and said second optical signal; and setting a splitting number of at least one of said first optical signal and said second optical signal such that an optical loss from said first center terminal to said first user terminal falls within said first allowed loss, and an optical loss from said second center terminal to said second user terminal falls within said second allowed loss.

12. The method as claimed in claim 11, further comprising the step of establishing a transmission line from said first user terminal to said first center terminal by time division multiplexing optical signals output from said first user terminals and supplying a time division multiplexed optical signal to said first center terminal.

* * * * *

UNITED STATES PATENT AND TRADEMARK OFFICE
CERTIFICATE OF CORRECTION

PATENT NO. : 5,668,652
DATED : September 16, 1997
INVENTOR(S) : HASHIMOTO et al.

It is certified that error appears in the above-identified patent and that said Letters Patent is hereby corrected as shown below:

Title page, Item [19] (Heading), and Item [75] Inventors, "Hashomoto" should be --Hashimoto--

Signed and Sealed this

Tenth Day of February, 1998

Attest:

BRUCE LEHMAN

Attesting Officer

Commissioner of Patents and Trademarks